US012700209B2

(12) United States Patent
Hong

(10) Patent No.: US 12,700,209 B2
(45) Date of Patent: Aug. 4, 2026

(54) APPARATUS AND METHOD FOR A VEHICLE RECOGNIZING AN OBJECT USING PATTERN RECOGNITION

(71) Applicants: HYUNDAI MOTOR COMPANY, Seoul (KR); KIA CORPORATION, Seoul (KR)

(72) Inventor: Seung-Pyo Hong, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 426 days.

(21) Appl. No.: 18/212,369

(22) Filed: Jun. 21, 2023

(65) Prior Publication Data

US 2024/0071032 A1 Feb. 29, 2024

(30) Foreign Application Priority Data

Aug. 31, 2022 (KR) ........................ 10-2022-0109725

(51) Int. Cl.
*G06V 10/20* (2022.01)
*B60Q 1/00* (2006.01)
*B60Q 1/24* (2006.01)
*G06V 20/56* (2022.01)

(52) U.S. Cl.
CPC ......... *G06V 10/255* (2022.01); *B60Q 1/0023* (2013.01); *B60Q 1/249* (2022.05); *G06V 20/56* (2022.01)

(58) Field of Classification Search
CPC ...... G01B 11/25; G06V 10/88; G06V 10/145; G06V 20/58
See application file for complete search history.

(56) References Cited

U.S. PATENT DOCUMENTS

| | | | | |
|---|---|---|---|---|
| 2009/0189858 A1* | 7/2009 | Lev | ......................... | G06F 3/017 |
| | | | | 348/222.1 |
| 2015/0319347 A1* | 11/2015 | Cottrell | ................... | H04N 23/56 |
| | | | | 348/81 |
| 2017/0163969 A1* | 6/2017 | Cronie | .................... | G06V 10/40 |
| 2018/0196998 A1* | 7/2018 | Price | ..................... | G01S 17/894 |
| 2019/0264890 A1* | 8/2019 | Chang | ................. | G01B 11/2513 |
| 2021/0389654 A1* | 12/2021 | Lee | ......................... | G02B 13/16 |
| 2022/0080974 A1 | 3/2022 | Han et al. | | |
| 2024/0029240 A1* | 1/2024 | Wang | ...................... | G06T 7/001 |

FOREIGN PATENT DOCUMENTS

| | | |
|---|---|---|
| KR | 102371617 B1 | 3/2022 |
| KR | 20220037531 A | 3/2022 |

* cited by examiner

*Primary Examiner* — Thanh Luu

(74) *Attorney, Agent, or Firm* — Lempia Summerfield Katz LLC

(57) ABSTRACT

An apparatus for recognizing an object of a vehicle using pattern recognition includes a first lamp including: a first optical device configured to generate light of a first pattern and irradiate the light of the first pattern to an object according to a predetermined cycle, and a second optical device configured to generate light of a second pattern and irradiate the light of the second pattern to the object. The apparatus further includes: a camera configured to recognize the first pattern irradiated to the object when the light of the first pattern is irradiated, and a control unit configured to acquire object recognition information of the object based on the first pattern recognized by the camera.

19 Claims, 26 Drawing Sheets

FIG. 11A
FIG. 11B
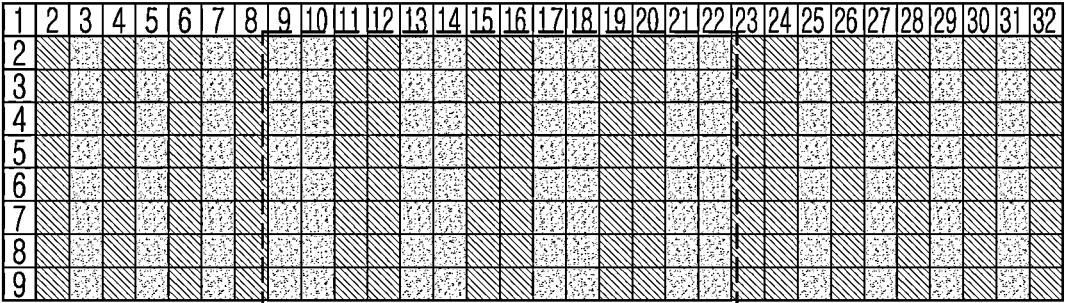
FIG. 11C
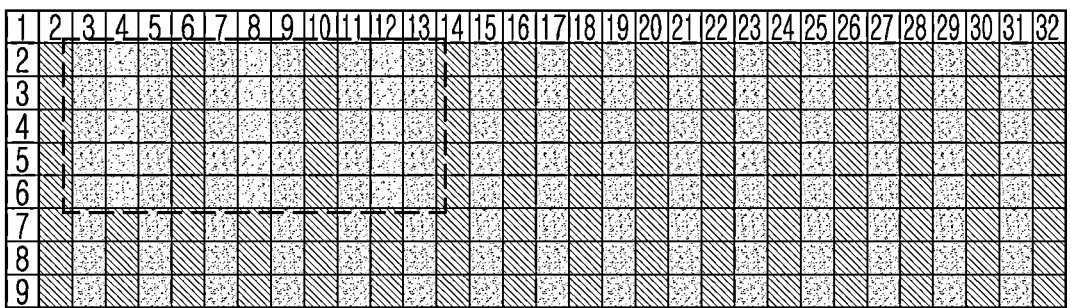

FIG. 11D

IN FRONT OF VEHICLE

APPARATUS AND METHOD FOR A VEHICLE RECOGNIZING AN OBJECT USING PATTERN RECOGNITION

CROSS-REFERENCE TO RELATED APPLICATION

This application claims priority to Korean Patent Application No. 10-2022-0109725, filed on Aug. 31, 2022, which is incorporated herein by reference in its entirety.

BACKGROUND

Field of the Disclosure

The present disclosure relates to an apparatus and method for estimating the presence of an object such as surrounding vehicles or facilities and a motion state of the object using pattern recognition.

Description of Related Art

In order to ensure safe driving when a vehicle travels, it is necessary to appropriately control the vehicle by recognizing the surrounding road environment and determining the movement of surrounding vehicles. However, a sensor is needed to compensate for the complexity of recognition in a spatial system of the vehicle, which also involves a change in a position (dimensional change) of an object. Conventionally, the human eye, which is the most advanced sensor, has played such a role. A headlamp of the vehicle has played an auxiliary role.

However, in an autonomous traveling system for actively controlling an inter-vehicle distance based on a traveling speed of the vehicle, the presence of surrounding vehicles, a traveling speed of a preceding vehicle, and the like, the human eye may not be used. Accordingly, in order to realize the autonomous traveling system, a system that may track surrounding objects and acquire various information on the surrounding objects is continuously being developed.

For example, a vehicle may acquire information on the surrounding vehicles using sensors such as a light detection and ranging (LiDAR). The system for recognizing the object using the LiDAR uses the property of a change in another dimension which replaces the advanced human eye by introducing the change in another dimension called time in order to solve the complexity due to the change in the position.

However, even in the case of using the LiDAR, there is a limit to accurately performing the role in response to the position change spatial system, such as the movement of the human eye. In order to solve the limit, it is necessary to add a plurality of sensors, but there is an economic difficulty in installing a plurality of expensive LiDARs.

As another alternative, there is presented the technique of imitating the human eye by acquiring the images of the surrounding vehicles using the image sensor such as the camera installed in the vehicle, and learning and calculating the changes in the images according to the change in the position through deep learning. The technique using the image sensor has the advantage of being inexpensive compared to the technique using the LiDAR.

However, in the process of processing the image acquired through the image sensor, since the object is recognized based on the difference in chromaticity or luminosity on the acquired image, there is a limit to recognizing the structure or movement of the object having the three-dimensional shape. In particular, there is difficulty in accurately recognizing the object which is present in front of the vehicle upon night driving in which it is not easy to distinguish luminosity or chromaticity. In addition, since the object recognition relies on deep learning, the accuracy of the object recognition varies depending on the degree of learning of applied deep learning. There is also a problem in that it takes a relatively long time to perform the calculation for the object recognition due to the complex calculation process of deep learning.

In light of the growing demand for the stability of autonomous traveling in the transitional stage where the development and introduction of autonomous vehicles are recently active, the need to accurately recognize the three-dimensional shape of the object within the complex spatial system increases. In particular, the market demand for pedestrian recognition rate at night is growing.

The contents described in Description of Related Art are to help the understanding of the background of the present disclosure and may include what is not previously known to those having ordinary skill in the art to which the present disclosure pertains.

In order to overcome the limits of the method of recognizing the object in the related art, the use of a method of recognizing a pattern may be considered. It is possible to partition an image region corresponding to a three-dimensional space recognized by a camera by irradiating a specific pattern in a visible ray region to a three-dimensional space in front of a vehicle through a headlamp of the vehicle. When the camera recognizes the image region partitioned as described above, the image region is divided into various spaces. Only the sense of change in a pattern in the divided space is extracted and calculated. It is possible to recognize an object, having a three-dimensional shape, and a motion state of the object quickly and accurately compared to the conventional calculation using deep learning.

However, not only the camera but also a driver of the corresponding vehicle or pedestrians around the vehicle visually recognize the pattern of the visible ray region irradiated to surrounding vehicles or pedestrians through the headlamp of the vehicle, which may cause visual confusion to the driver who drives the corresponding vehicle or pedestrians around the vehicle.

In addition, when pattern-shaped light is irradiated in front of the vehicle using the headlamp of the vehicle, a region where light is irradiated from the lamp and a region where light is blocked are alternately present to form a pattern shape, so that there is also a concern that light distribution performance required for the headlamp of the vehicle may not be satisfied.

SUMMARY OF THE DISCLOSURE

An object of the present disclosure is to provide a technique of recognizing an object which can overcome the above-described limit when the object in front of the vehicle is recognized by applying pattern recognition and overcome the limitations of each technique as well as having the advantages of both the conventional technique of recognizing the object through the camera recognition and the technique of recognizing the object using the LiDAR.

An apparatus for recognizing an object of a vehicle using pattern recognition according to the present disclosure for achieving the object may include: a first lamp including a first optical device configured to generate light of a first pattern and irradiate the light of the first pattern to an object according to a predetermined cycle and a second optical device configured to generate light of a second pattern and irradiate the light of the second pattern to the object; a camera configured to recognize the first pattern irradiated to the object when the light of the first pattern is irradiated; and a control unit configured to acquire object recognition information of the object based on the first pattern recognized by the camera.

A cycle at which the first optical device and the second optical device irradiate light may be 60 Hertz (Hz) or higher.

The light of the second pattern may be irradiated so that each pattern constituting the second pattern alternates with each pattern constituting the first pattern.

The first optical device and the second optical device may be controlled by a single lamp control unit.

The first optical device, the second optical device, and the camera may be configured as a single integrated semiconductor device.

The control unit may acquire distance information between the object and the vehicle using at least one of a width of the first pattern irradiated to the object, a size of the first pattern, a number of first patterns, or a contrast of the first pattern.

The control unit may acquire shape information of the object using a change in a slope of the first pattern irradiated to the object.

The first pattern and the second pattern may be formed by partially shielding the light from the first optical device and the second optical device using a physical blocking element.

The first pattern and the second pattern may be formed using an inner lens having a predetermined pattern shape disposed of in front of light irradiation directions of the first optical device and the second optical device.

The first optical device and the second optical device may be configured as a matrix light-emitting diode (LED) or a micro-LED.

The first lamp may include a rotational body configured to rotate around a predetermined rotational axis. The first optical device and the second optical device may be provided on an outer circumferential surface of the rotational body with a predetermined phase difference.

The camera may be configured to recognize the first pattern irradiated to the object when the rotational body rotates to a predetermined phase so that the first optical device is positioned in a direction of irradiating light toward the object.

The apparatus may further include a camera-blocking shield configured to block image recognition of the camera when the first optical device is not positioned in a direction of irradiating light toward the object on the rotational body.

The apparatus may further include a mechanical filter configured to transmit the light of the first pattern and block the light of the second pattern or a software filter configured to selectively calculate only the light of the first pattern in front of the camera.

The apparatus may be configured to vary the pattern shape of the light of the first pattern generated from the first optical device which is configured to be changed whenever the first optical device is turned on.

The apparatus may be configured to change at least one of a pattern shape, a wavelength, and an intensity of the light of the first pattern generated from the first optical device based on an intensity of light outside the vehicle.

Power may be applied to the camera so that the camera is operated only when the first optical device operates and the first optical device irradiates light to the object.

The camera may be configured so that a plurality of pixels is alternately operated in a unit of a pixel group and configured so that only a specific pixel group that matches a frame in which the first optical device operates when power is applied to the camera is operated.

The control unit may acquire object recognition information of the object by selectively extracting only a frame corresponding to a control duty which operates the first optical device among frames recognized by the camera.

The control unit may partition information recognized by the camera and acquire object recognition information of the object only based on a change in a first pattern in a specific partition.

The apparatus may further include: a second lamp including a third optical device configured to generate light of a third pattern and irradiate the light of the third pattern to the object according to a predetermined cycle; and a fourth optical device configured to generate light of a fourth pattern and irradiate the light of the fourth pattern to the object when the light of the third pattern is not irradiated. The camera may be configured to recognize the first pattern and the third pattern irradiated to the object. The control unit may acquire object recognition information of the object based on the first pattern and the third pattern recognized by the camera.

The camera may be disposed of between the first lamp and the second lamp.

The camera may include a first camera configured to recognize the light of the first pattern irradiated to the object and a second camera configured to recognize the light of the third pattern irradiated to the object. The first camera may be provided inside the second lamp, and the second camera may be provided inside the first lamp.

A method of recognizing an object of a vehicle using pattern recognition according to the present disclosure for achieving the object may include: generating light of a first pattern and light of a second pattern and alternately irradiating the light to an object; recognizing a shape of the first pattern irradiated to the object using a camera when the light of the first pattern is irradiated to the object; and extracting a change in the first pattern recognized by the camera and acquiring object recognition information of the object based on the extracted change in the first pattern.

The method may further include determining whether a predetermined pattern change condition is satisfied and adjusting at least one of a shape, a wavelength, or an intensity of the first pattern when the predetermined pattern change condition is satisfied.

According to the present disclosure, it is possible to combine the advantages, such as the low cost, the sensor having relatively small size, the color discrimination ability, and the data reprocessing ability, of the conventional technique of recognizing the object using the camera in the related art, and the advantages, such as the three-dimensional spatial recognition power and the night object recognition power, of the technique of recognizing the object using the LiDAR by recognizing the pattern irradiated from the vehicle toward the object using the image sensor such as the camera to recognize the three-dimensional object.

In addition, according to the present disclosure, it is possible to recognize the object with high accuracy in a short time compared to the camera recognition technique by deep learning by extracting and calculating only the changes according to the time and space of the pattern among the images acquired by the camera.

In addition, according to the present disclosure, it is possible to prevent the degradation of the performance of the optical device which occurs when the pattern is generated using one optical device, and prevent the confusion of the driver who visually and directly recognizes the pattern by alternately operating two optical devices configured to irradiate the pattern-shaped light for a very short cycle. Accordingly, it is possible to improve the visibility of the driver.

In addition, according to the present disclosure, it is possible to improve the shape recognition rate through the camera by providing the logic and structure which allow the camera to selectively recognize only the light from any one optical device when irradiating with the pattern-shaped light by alternately operating two optical devices.

In addition, according to the present disclosure, it is possible to ensure safe driving and decrease the accident rate by suppressing the moiré phenomenon or the like, which occurs depending on the performance of the camera sensor, such as the moiré phenomenon, when the object is recognized through the pattern recognition.

BRIEF DESCRIPTION OF THE DRAWINGS

FIG. 7A is a view showing an example of a first optical device applicable to the apparatus for recognizing the object of the vehicle according to one embodiment of the present disclosure.

FIG. 8 is a view showing the example of the first optical device applicable to the apparatus for recognizing the object of the vehicle according to one embodiment of the present disclosure.

FIGS. 11A-11D are views for describing operations for preventing pattern erroneous recognition in the apparatus for recognizing the object of the vehicle according to one embodiment of the present disclosure.

DESCRIPTION OF SPECIFIC EMBODIMENTS

Figure 1:
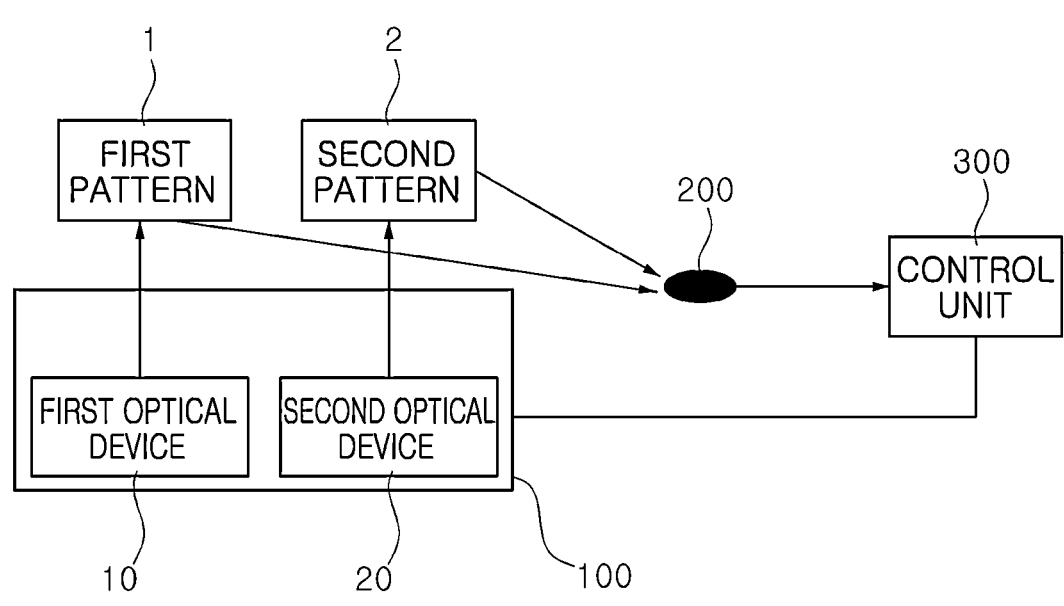
FIG. 1 is a block diagram showing a configuration of an apparatus for recognizing an object of a vehicle according to one embodiment of the present disclosure.

Hereinafter, some embodiments of the present disclosure are described in detail with reference to drawings. In adding reference numerals to components of each drawing, it should be noted that the same components are given the same reference numerals as much as possible even though they are indicated on different drawings. In addition, in describing embodiments of the present disclosure, when it is determined that a detailed description of a related known configuration or function interferes with the understanding of embodiments of the present disclosure, the detailed description thereof is omitted.

When a component, device, element, or the like of the present disclosure is described as having a purpose or performing an operation, function, or the like, the component, device, or element should be considered herein as being "configured to" meet that purpose or to perform that operation or function.

Figure 2A:
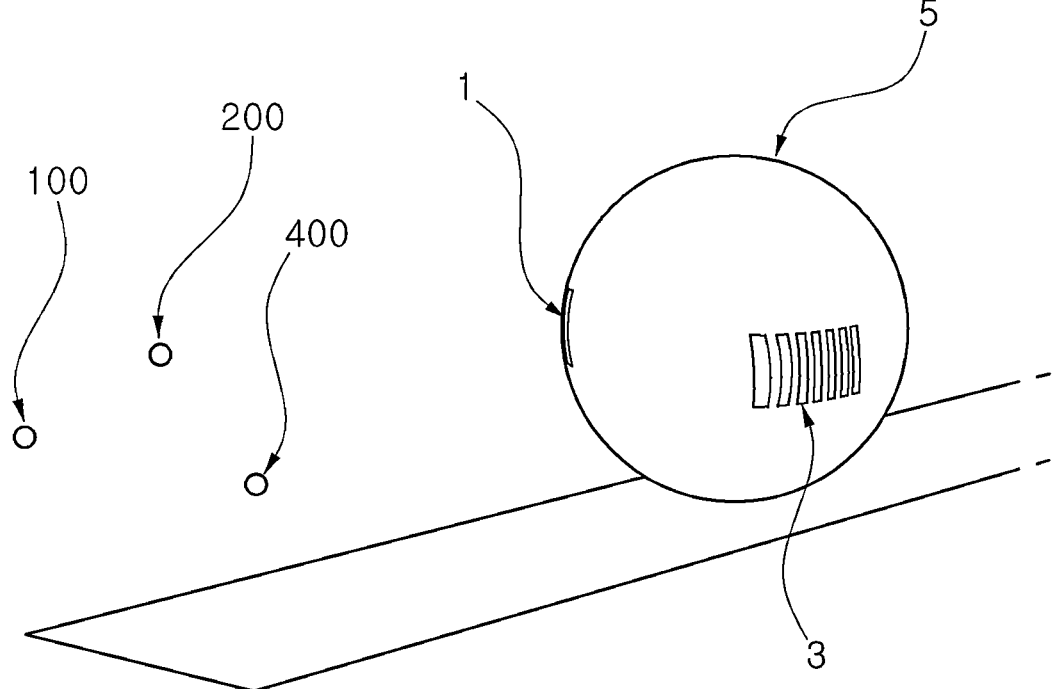
FIG. 2A is a perspective view for describing an operation of the apparatus for recognizing the object of the vehicle according to one embodiment of the present disclosure.
Figure 2B:
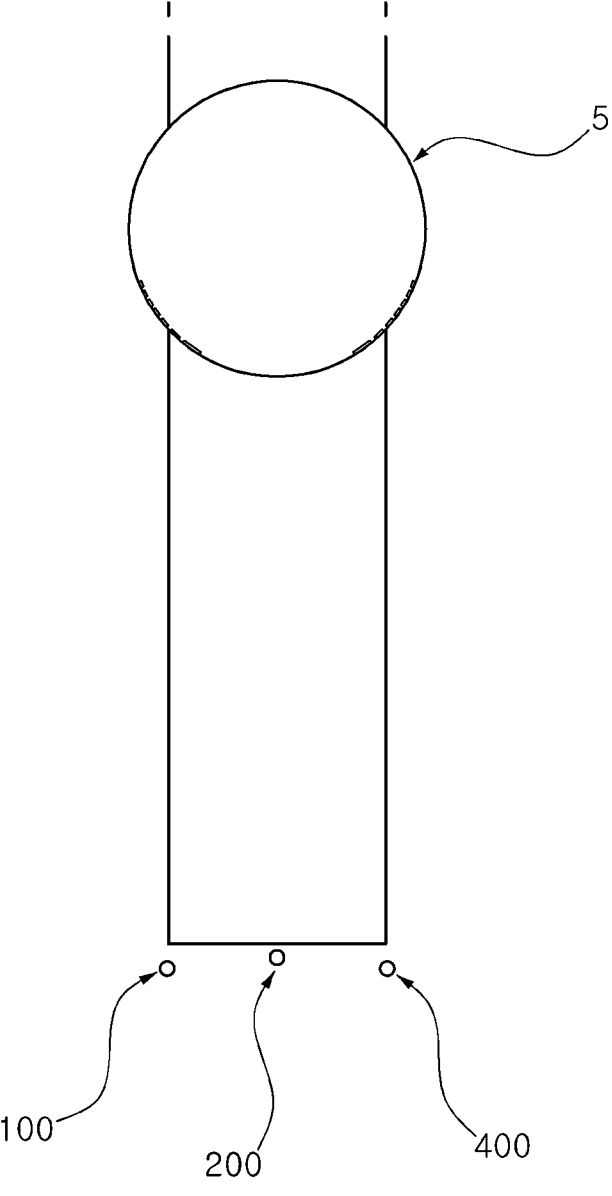
FIG. 2B is a plan view of FIG. 2A
Figure 2C:
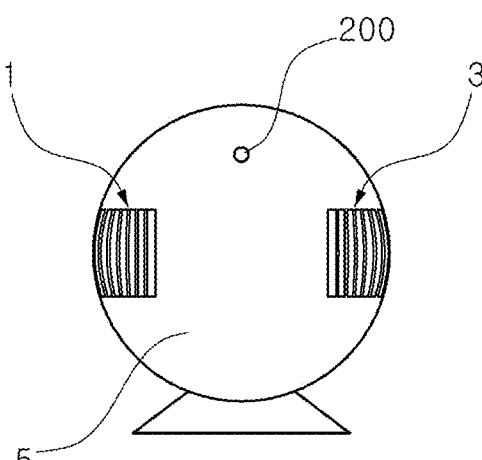
FIG. 2C is a front view showing a shape of an object irradiated with a pattern.

FIG. 1 is a block diagram showing a configuration of an apparatus for recognizing an object of a vehicle according to one embodiment of the present disclosure, FIG. 2A is a perspective view for describing an operation of the apparatus for recognizing the object of the vehicle according to one embodiment of the present disclosure, FIG. 2B is a plan view of FIG. 2A from the top. FIG. 2C is a front view showing a shape of an object irradiated with a pattern.

Referring to FIG. 1, the apparatus for recognizing the object of the vehicle according to one embodiment may include: a first lamp 100 composed of a first optical device 10 configured to generate and irradiate light of a first pattern 1 and a second optical device 20 configured to generate and irradiate light of a second pattern 2; a camera 200 configured to recognize the light of the first pattern 1; and a control unit 300 configured to control operations of the lamp 100 and the camera 200 and perform object recognition processing from an image acquired by the camera 200.

The apparatus shown in FIG. 1 may be mounted on a vehicle. The first lamp 100 may constitute a headlamp provided in front of the vehicle.

Figure 3:
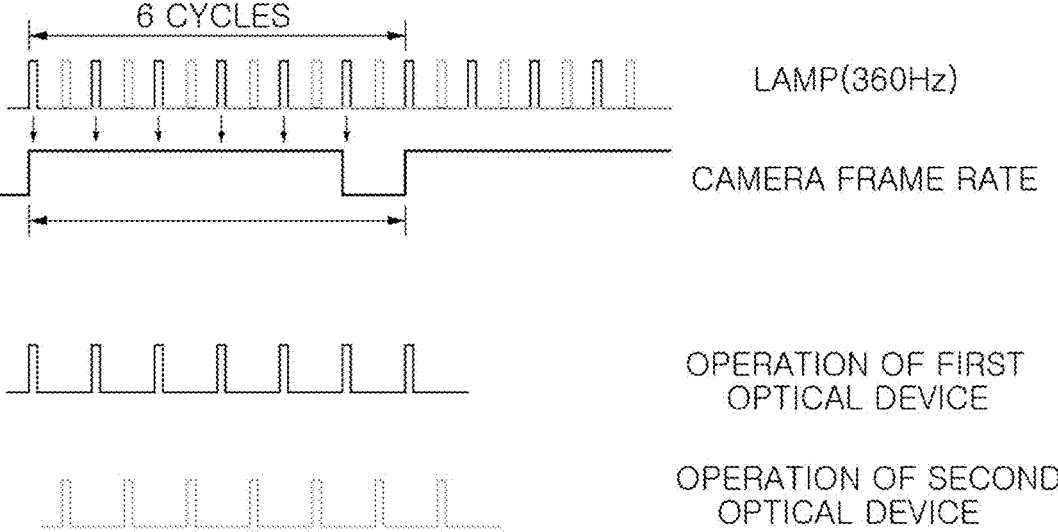
FIG. 3 is a signal diagram showing an operation cycle of a lamp of the apparatus for recognizing the object of the vehicle according to one embodiment of the present disclosure.

The first optical device 10 may function to generate and irradiate the light of the first pattern 1 in which a light irradiation region, which is a region where an object is brightly reflected by the light irradiated from the first optical device 10 and a light blocking region where the light from the first optical device 10 does not reach the object are alternately present. The first optical device 10 may be a matrix light emitting diode (LED) or a micro-LED. In addition, as shown in FIG. 3, the first optical device 10 may be configured to be repeatedly turned on and off at a very short cycle. For example, the first optical device 10 may be configured to be repeatedly turned on and off at a cycle of 60 Hertz (Hz) or higher.

The second optical device 20 may function to generate and irradiate the light of the second pattern 2 in which a light irradiation region, which is a region where an object is brightly reflected by the light irradiated from the second optical device 20 and a light blocking region where the light from the second optical device 20 does not reach the object are alternately present. Here, the light irradiation region of the second pattern 2 may be formed to fill a region between the light irradiation region and the light blocking region of the first pattern 1. Like the first optical device 10, the second optical device 20 may be the matrix LED or the micro-LED. In addition, as shown in FIG. 3, the second optical device 20 may be configured to be turned off when the first optical device 10 is turned on and turned on when the first optical device 10 is turned off. Accordingly, the second optical device 20 may be configured to be repeatedly turned on and off at the same cycle with a time difference from the first optical device 10.

The camera 200 may function to capture an object 5 positioned in front of the vehicle and a shape of a pattern irradiated to the object 5 when the light of the first pattern 1 is irradiated to the object 5. The camera 200 may include a charge-coupled device (CCD) camera or a complementary metal-oxide-semiconductor (CMOS) color image sensor.

The control unit 300 may be electrically connected to the first optical device 10, the second optical device 20, and the camera 200. The control unit 300 may control the operations of the first optical device 10, the second optical device 20, and the camera 200. The control unit 300 may also process and calculate various data from an image including the first pattern 1 acquired by the camera 200. The control unit 300 may be an information processing device such as an electronic control unit (ECU) mounted on the vehicle.

According to one embodiment of the present disclosure, the first optical device 10, and the second optical device 20 may be repeatedly turned on alternately at a very fast cycle.

As described above, the light of the first pattern 1 from the first optical device 10 may alternately have the light irradiation region and the light blocking region in order to constitute a pattern shape. Accordingly, it is impossible to illuminate the entire required region in front of the vehicle with only the first optical device 10. When a headlamp of the vehicle is configured with only the first optical device 10, it is difficult to secure the amount of light required for the headlamp.

Accordingly, in one embodiment of the present disclosure, as described above, the second optical device 20 may be provided in addition to the first optical device 10. In addition, when the first optical device 10 is turned off, the second optical device 20 is turned on, and the light of the second pattern 2 from the second optical device 20 functions to fill a region where the light of the first pattern 1 of the first optical device 10 is reflected. As described above, since the first optical device 10 and the second optical device 20 are repeatedly turned on, and the light from each optical device fills each other's insufficient amounts of light and light irradiation regions, it is possible to solve a problem such as the insufficient amount of light when the light having the pattern shape is irradiated.

In addition, when the headlamp of the vehicle is configured with only the first optical device 10, a driver or surrounding pedestrians may visually recognize the first pattern 1 displayed on the object when the light of the first pattern 1 from the first optical device 10 is irradiated to the object so that there is a concern of causing visual confusion to the driver or the surrounding pedestrians.

However, as in one embodiment of the present disclosure, when the second optical device 20 is further provided and the first optical device 10 and the second optical device 20 are alternately turned on repeatedly at a very fast cycle, the driver or external pedestrians may not visually recognize the repeated turning on and off of the optical device and the change in the pattern by the optical device. In particular, as described above, when the first optical device 10 and the second optical device 20 are alternately turned on repeatedly at a rapid cycle of 60 Hz or higher, the human eye may not recognize a state in which the first optical device 10 and the second optical device 20 are turned on and off and drivers or pedestrian may mistake a pattern 6 in which the first pattern 1 and the second pattern 2 are combined as being continuously irradiated in front of the vehicle. The first optical device 10 and the second optical device 20 may be alternately turned on repeatedly at a fast cycle of 120 Hz or higher.

Accordingly, according to one embodiment of the present disclosure, it is possible to prevent the confusion of the driver or the surrounding pedestrians who visually recognize the corresponding pattern when light of a specific pattern is irradiated for object recognition.

The camera 200 according to one embodiment of the present disclosure may be configured to selectively recognize only the pattern by the light of the first pattern 1 among the light of the first pattern 1 and the light of the second pattern 2 and acquire an image including the pattern. The camera 200 may operate at 360 Hz so that flicker does not occur in the camera 200, but the frequency may also be adjusted to a lower frequency according to the specification of the camera 200 or the control unit 300. In addition, it is also possible to alleviate the flicker phenomenon by adjusting the camera 200 and the first lamp 100 so that a value of (non-exposure time of the camera-turning-on time of the lamp)/(one cycle time of the lamp) becomes 0 or 1. Since the camera 200 operates at a very high speed (36 or 60 frames per second or FPS) compared to a frequency (10 Hz) of the general LiDAR, it is possible to decrease an error when various patterns of the first optical device 10 are input at 1 FPS of the camera 200 by operating the lamp at a higher frequency (60 Hz or higher).

A means for allowing the camera 200 to selectively recognize only the light of the first pattern 1 is described below in detail with reference to FIGS. 9A, 9B, and 13A-17.

In addition, the control unit 300 may identify a motion state of the object 5 such as a shape of the object 5 and a distance from the object 5 by analyzing the temporal and spatial changes of the shape of the first pattern 1 irradiated to the object 5. The specific content of the method of recognizing the object using the pattern is described below in detail with reference to FIGS. 5A-6C.

FIG. 1 shows only the first lamp 100 composed of the first optical device 10 and the second optical device 20, but the present disclosure is not limited to the above example. In other words, as shown in FIG. 2A, the apparatus for recognizing the object may further include a second lamp 400 including a third optical device (not shown) configured to correspond to the first optical device 10 and generate light of a third pattern 3 and a fourth optical device (not shown) configured to correspond to the second optical device 20 and generate light of a fourth pattern. In other words, like the first lamp 100, it is possible to form a pattern for object recognition using the light of the third pattern 3 from the third optical device of the second lamp 400, compensate for insufficient optical performance using the light of the fourth pattern, and prevent the pattern from being visually recognized.

As shown in FIGS. 2A and 2B, the light of the first pattern 1 from the first optical device 10 of the first lamp 100 may be irradiated to one surface of the object 5 in front of the vehicle. The light of the third pattern 3 from the third optical device of the second lamp 400 may be irradiated to the other surface thereof.

The first lamp 100 may constitute a left headlamp of the vehicle. The second lamp 400 may constitute a right headlamp of the vehicle.

As described above, the light of the second pattern 2 may function to compensate for the amount of light, or the like, by illuminating the region where the light of the first pattern 1 is not irradiated. However, as necessary, the light pattern of the second pattern 2 may also be temporarily adjusted so that the light of the first pattern 1 is irradiated to overlap the brightly reflected region. When the optical device is configured as a micro-LED or a matrix LED, the pattern may be adjusted by changing a state in which some of pluralities of LEDs are turned on and off.

Figure 4A:
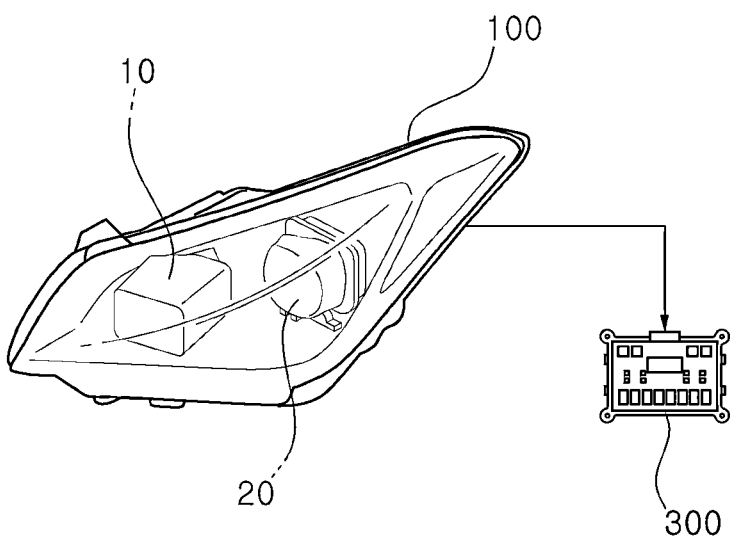
FIGS. 4A and 4B are perspective views each showing an example of the lamp to which the apparatus for recognizing the object of the vehicle according to one embodiment of the present disclosure is applied.
Figure 4B:
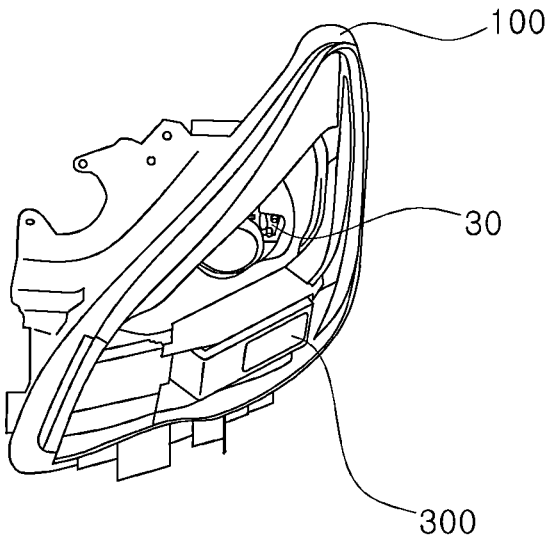

FIGS. 4A and 4B are perspective views showing each of an example and another example of the lamp to which the apparatus for recognizing the object of the vehicle according to one embodiment of the present disclosure is applied.

Referring to FIG. 4A, the first lamp 100 may constitute the left headlamp of the vehicle, and the first optical device 10 and the second optical device 20 may be configured to be spaced apart from each other inside a lamp housing as separate bodies. In addition, in order to alternately operate the first optical device 10 and the second optical device 20 at a very high frequency, the first optical device 10 and the second optical device 20 may share the single control unit 300 configured to control the lamp control.

In FIG. 4A, the first optical device 10 and the second optical device 20 may form separate optical systems, whereas in the example shown in FIG. 4B, the first optical device 10 and the second optical device 20 may be configured as a part component of a single integrated semiconductor device 30. For example, it is possible to constitute the first optical device 10 with any of the matrix LED or the micro-LED devices, and constitute the second optical device 20 with the rest. It is possible to form a more natural pattern. Furthermore, all of the first optical device 10, the second optical device 20, and an image sensor constituting the camera 200 may also be integrated and configured as the single integrated semiconductor device 30. Accordingly, it is possible to more precisely control a difference between a turning-on time of the optical device and an operation time of the camera. When the number of pixels of the image sensor constituting the camera 200 is configured to be greater than or equal to the number of LED pixels constituting the optical devices 10 and 20, more precise measurement may be performed by acquiring a higher resolution image.

Figure 5A:
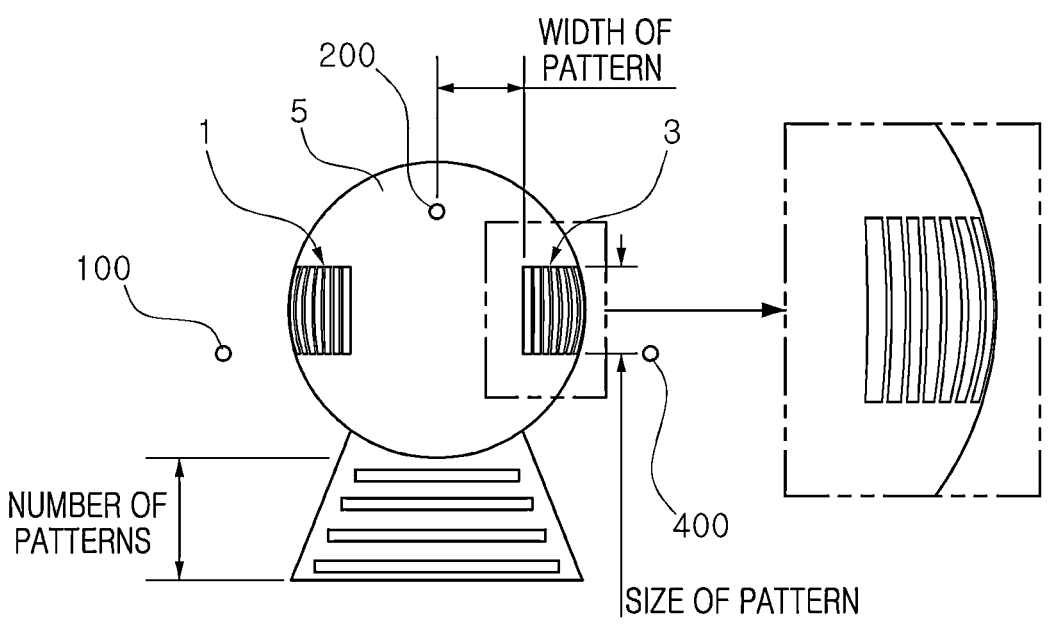
FIGS. 5A to 5C are views for describing an operation of detecting a distance from an object using a pattern in the apparatus for recognizing the object of the vehicle according to one embodiment of the present disclosure.
Figure 5B:
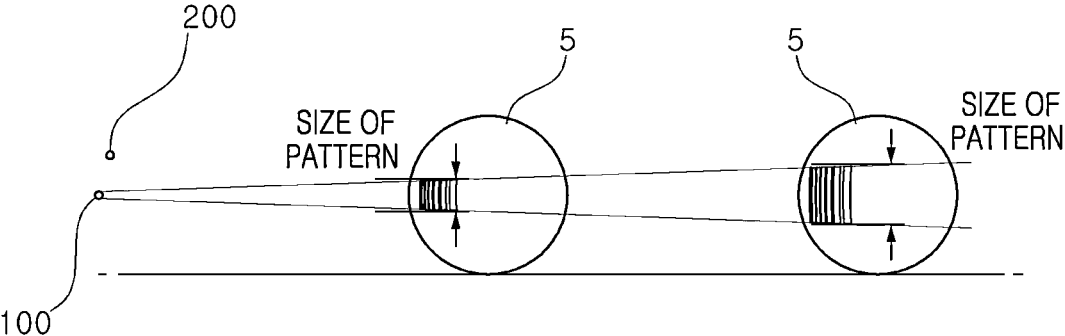
Figure 5C:
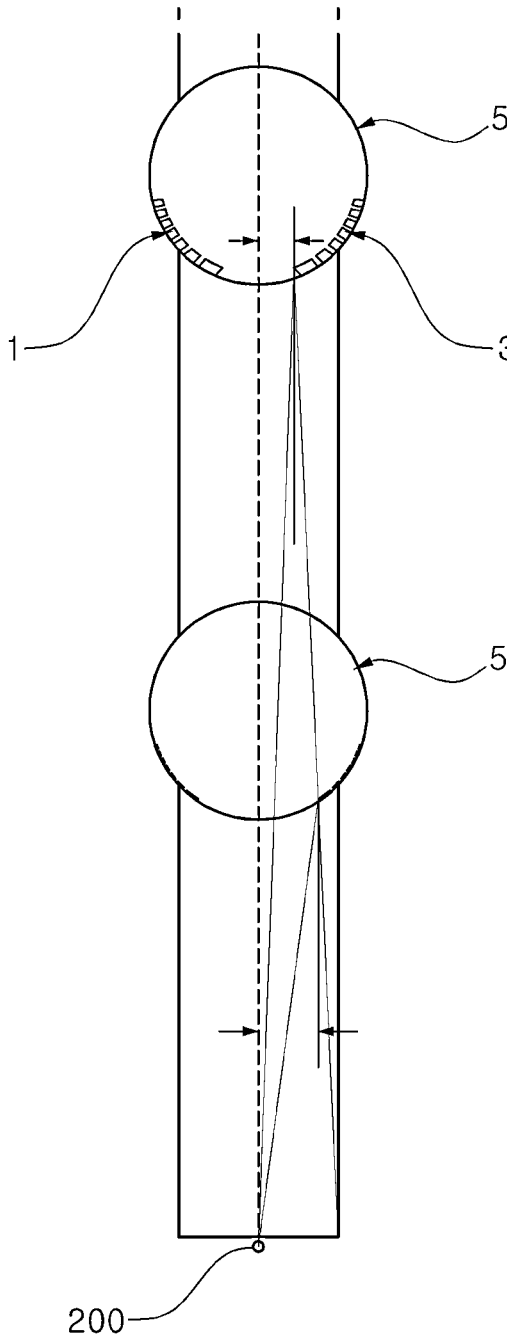

FIGS. 5A-5C are views for describing an operation of detecting a distance from an object using a pattern in the apparatus for recognizing the object of the vehicle according to one embodiment of the present disclosure.

FIG. 5A shows a shape of a pattern displayed on the object 5 and a road surface when light is irradiated from the first lamp 100 and the second lamp 400 to the object 5 and the road surface on which the object 5 is present.

In the example shown in FIG. 5A, the light of the first pattern 1 irradiated from the first optical device 10 of the first lamp 100 may be irradiated to the left of the object 5. The light of the third pattern 3 irradiated from the third optical device of the second lamp 400 may be irradiated to the right of the object 5.

When the pattern irradiated to the object 5 is captured by the camera 200, information related to the shape of the pattern shown in FIG. 5A may be acquired. In other words, information on a width of a pattern corresponding to a horizontal distance from a virtual center line of the camera 200 to the pattern and a pattern size corresponding to a vertical height of the pattern itself may be acquired. In addition, when the pattern is configured to be irradiated on the road surface, information on the number of patterns corresponding to the number of patterns displayed on the road surface between the object 5 and the vehicle may also be acquired. In addition, although not shown, information on the brightness of the pattern may also be acquired from the camera 200.

As described above, a distance of the object from the vehicle may be calculated from the information on the width of the pattern, the size of the pattern, the brightness of the pattern, and the number of patterns acquired from the camera 200 and their spatial and temporal changes.

For example, as shown in FIG. 5B, since an image of the pattern from the light source is enlarged as the object 5 moves away from the front of the vehicle equipped with the apparatus for recognizing the object, a size of the pattern irradiated to the object 5 may increase. On the other hand, since the image of the pattern from the light source is not sufficiently enlarged as the object 5 gets closer to the vehicle, the size of the pattern may relatively decrease.

On the other hand, as shown in FIG. 5C, the distance between the virtual center line of the camera and the pattern may decrease as the object 5 moves away from the front of the vehicle equipped with the apparatus for recognizing the object. The distance between the virtual center line of the camera and the pattern increases as the object 5 gets closer to the vehicle.

In addition, the brightness of the pattern may increase as the object 5 gets closer to the vehicle. The brightness of the pattern darkens due to the lack of light as the object 5 moves away from the vehicle.

Further, the number of patterns spread on the road surface may decrease as the object 5 gets closer to the vehicle. The number of patterns spread on the road surface increases as the object 5 moves away from the vehicle.

As described above, when the width of the pattern, the size of the pattern, the brightness of the pattern, and the number of patterns acquired from the image captured by the camera 200 and their spatial and temporal changes are analyzed, the distance from the vehicle to the object 5 is determined may be calculated.

Figure 6A:
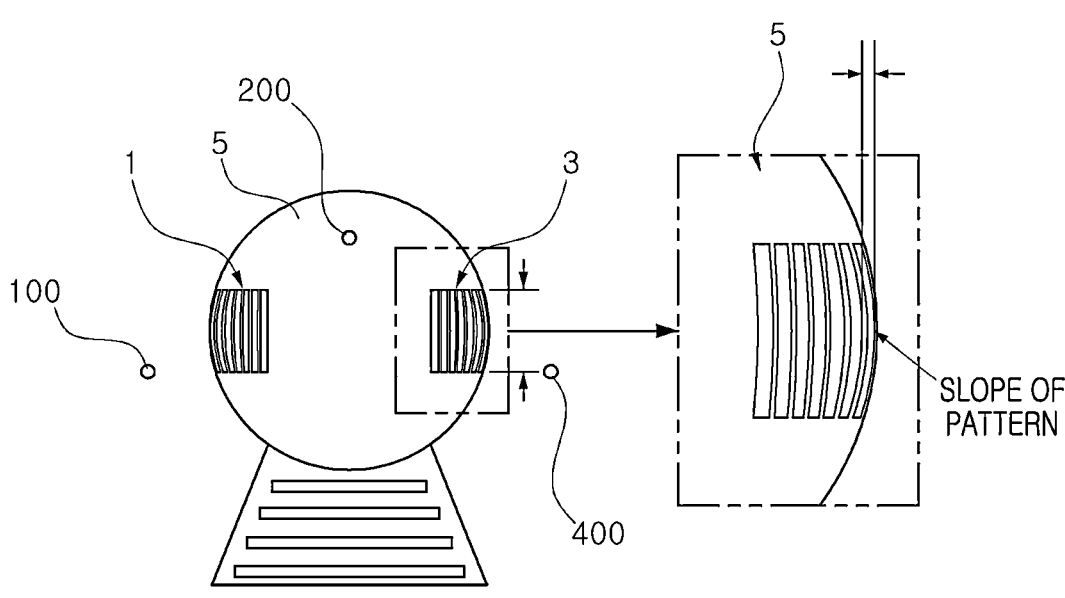
FIGS. 6A to 6C are views for describing an operation of detecting a shape of the object using the pattern in the apparatus for recognizing the object of the vehicle according to one embodiment of the present disclosure.
Figure 6B:
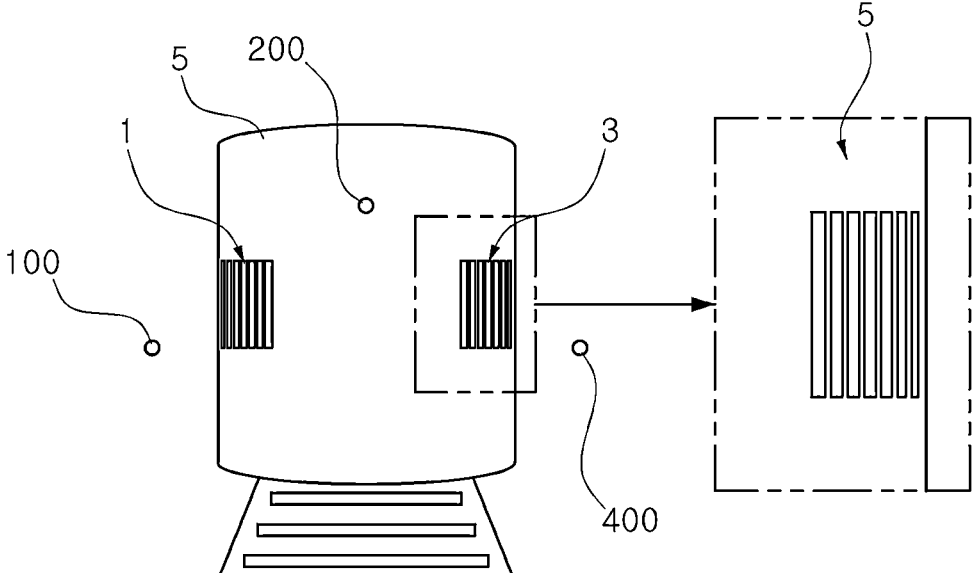
Figure 6C:
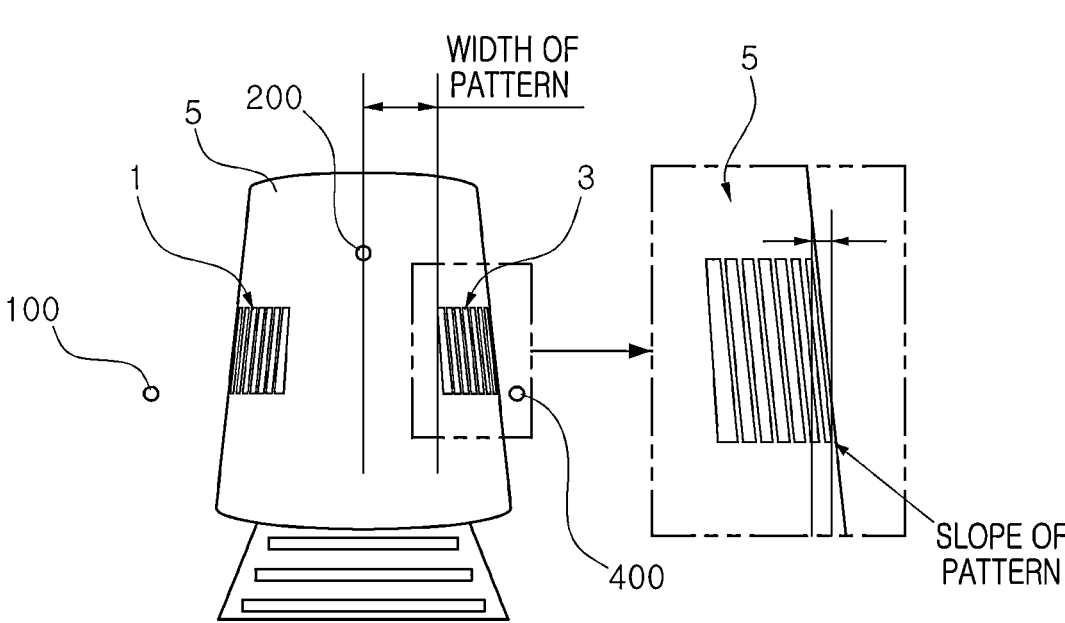

FIGS. 6A-6C are views for describing an operation of detecting a distance from the object and a shape of the object using the pattern in the apparatus for recognizing the object of the vehicle according to one embodiment of the present disclosure.

FIGS. 6A-6C show the shapes of the patterns reflected on the objects 5 when the patterns are irradiated to the objects 5 having different shapes. As shown in FIGS. 6A-6C, when a shape of the pattern reflected on the object 5 and a change in a slope of the pattern are detected, an approximate shape of the object may be calculated.

For example, as shown in FIG. 6C, the approximate shape of the object 5 may be understood from the change in the slope of the pattern. When there is no inflection point of the slope of the pattern, it may be understood that the distance of the object 5 from the vehicle is constant, that is, a surface of the object 5 facing the vehicle is flat.

In addition, when there is no inflection point of the slope of the pattern and a pattern tilted downward or upward is detected, it may be determined that the closest portion is out of the pattern region, and thus the pattern may be changed.

Figure 7A:
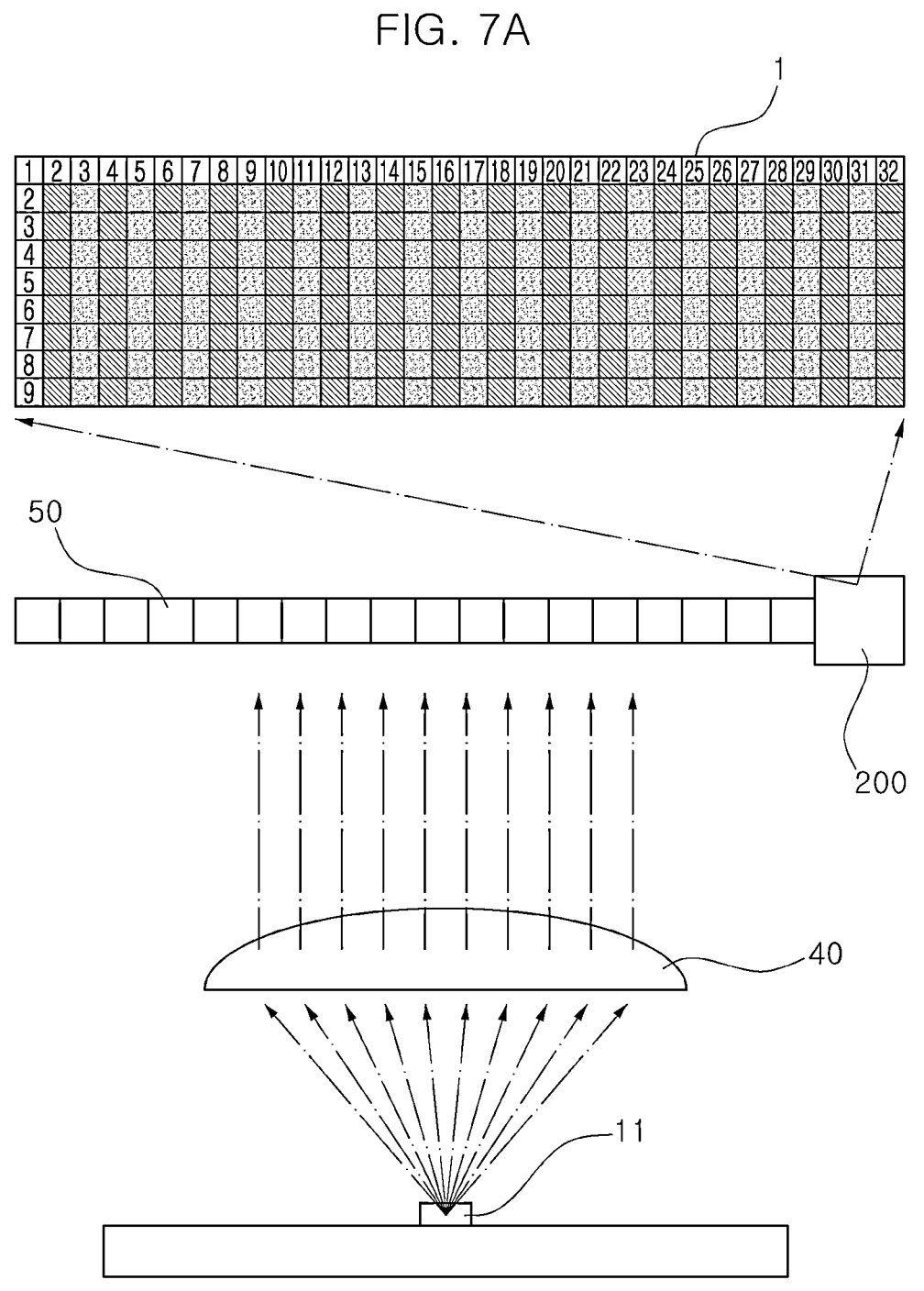
Figure 7B:
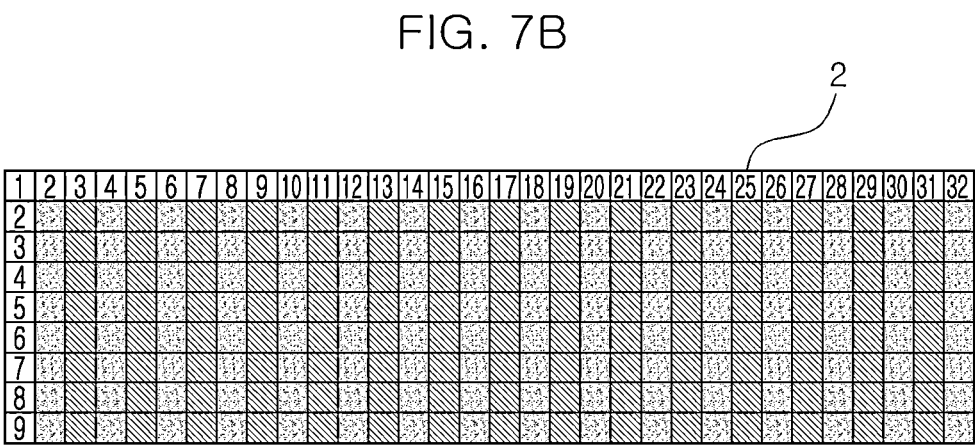
FIG. 7B is a view showing an example of a second optical device applicable to the apparatus for recognizing the object of the vehicle according to one embodiment of the present disclosure.

FIG. 7A is a view showing an example of the first optical device 10 applicable to the apparatus for recognizing the object of the vehicle according to one embodiment of the present disclosure. FIG. 7B is a view showing an example of the second optical device 20 applicable to the apparatus for recognizing the object of the vehicle according to one embodiment of the present disclosure.

Figure 7B:
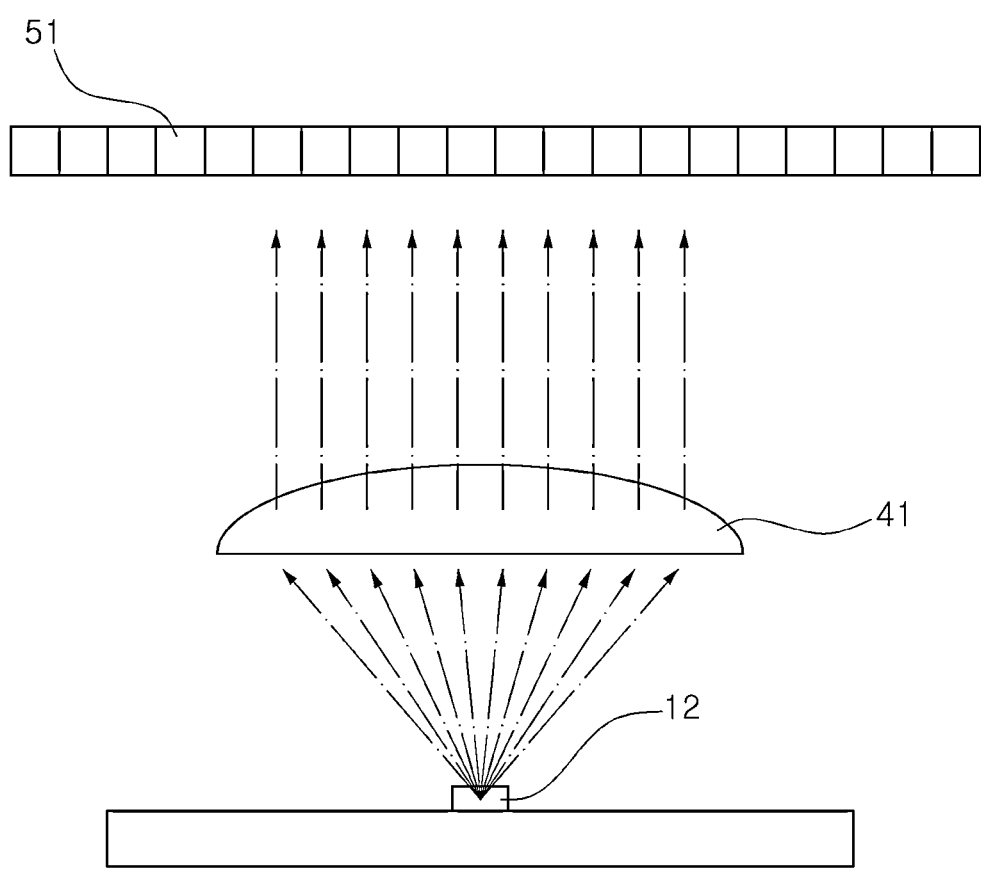
Figure 8:
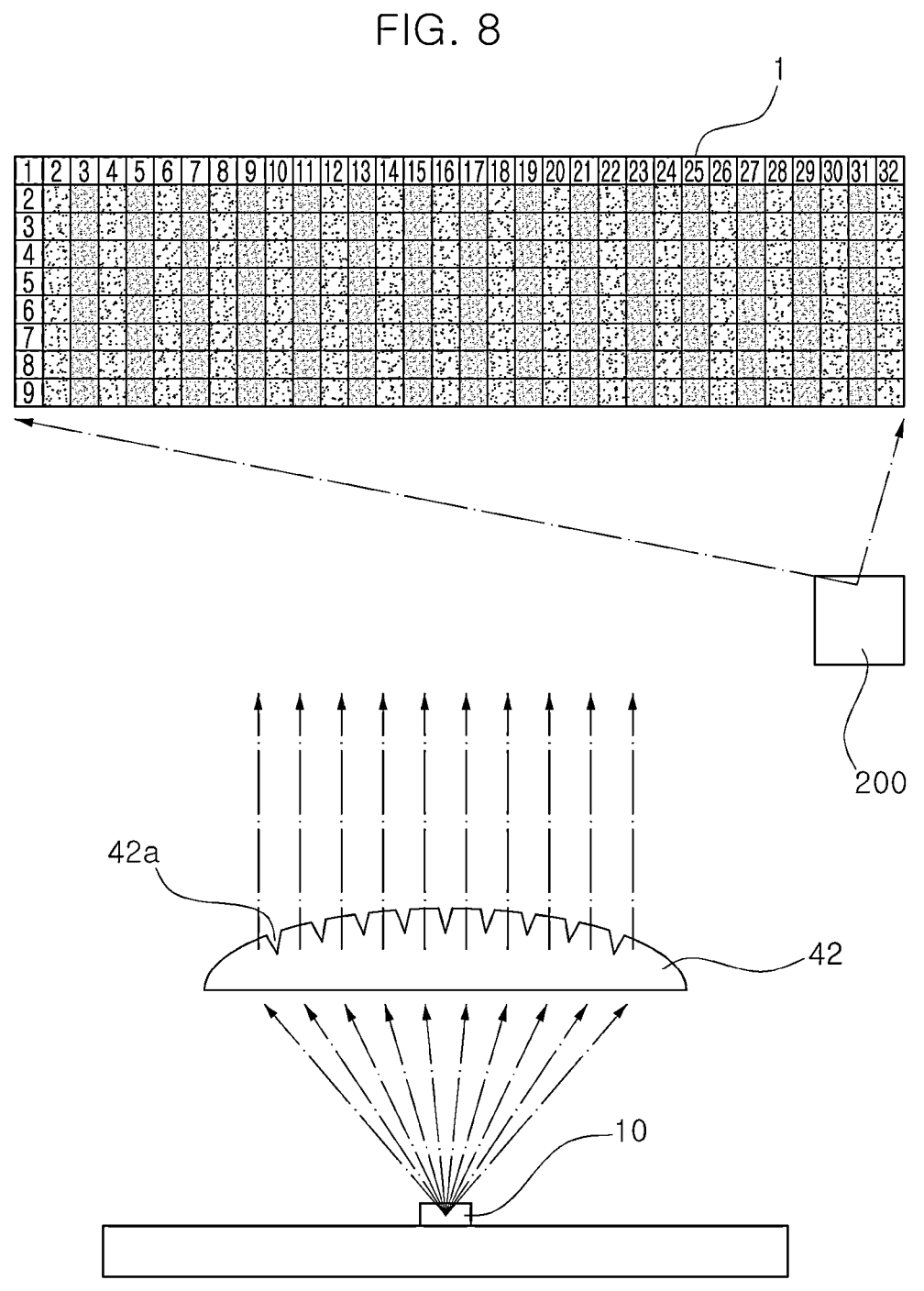

As described above, when the first optical device 10 and the second optical device 20 are configured as the micro-LED or the matrix LED, some of the LEDs may be turned on and the remaining LEDs may be turned off to form light of a pattern having a predetermined shape. In addition to the above examples, the light of the first and second patterns may be formed by constituting the optical systems having the forms shown in FIGS. 7A-8.

For example, in the examples shown in FIGS. 7A and 7B, light having a predetermined pattern may be generated and irradiated forward by providing light sources 11 and 12, an inner lens 40, and blocking elements 50 and 51.

The first optical device 10 may include the inner lens 40 configured to refract the light generated from the light source 11 in an appropriate direction disposed of in front of the light source 11 such as an LED and the first blocking element 50 which is a shielding screen disposed of in front of the inner lens 40 and configured to partially block the light passing through the inner lens 40 to form a pattern. The light of the first pattern 1, as shown in FIG. 7A, may be formed.

Likewise, the second optical device 20 may also include a second light source 12, a second inner lens 41, and a second blocking element 51 corresponding to the second pattern 2 and thus form the light of the second pattern 2 as shown in FIG. 7B.

As described above, in FIGS. 7A and 7B, the pattern may be formed by providing the blocking elements 50 and 51 configured to partially block light, but the present disclosure is not limited to the above examples. For example, instead of providing the blocking elements 50 and 51, as in the example shown in FIG. 8, the light of the first pattern 1 may also be formed by adopting the inner lens 42 in which a predetermined pattern 42a is formed.

Figure 9A:
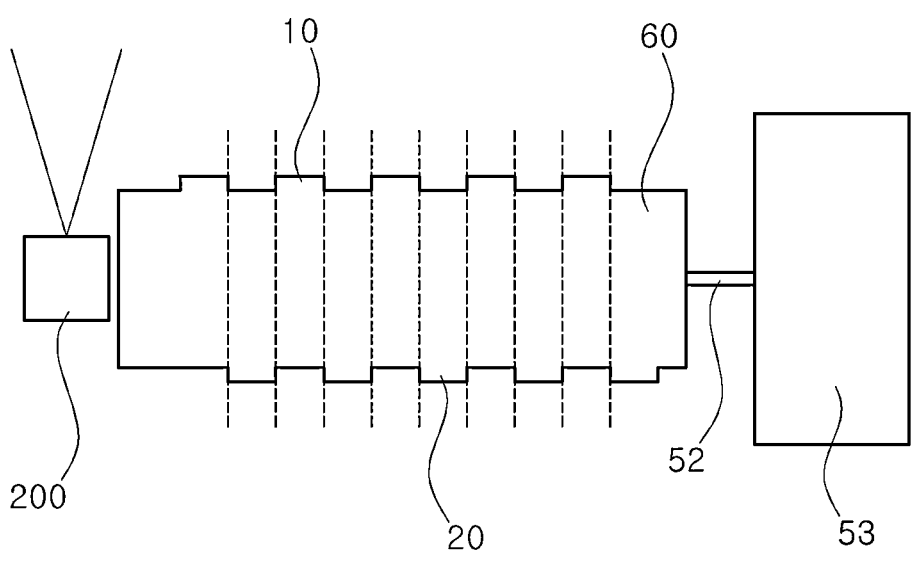
FIGS. 9A and 9B are views for describing a structure of a lamp applicable to the apparatus for recognizing the object of the vehicle according to one embodiment of the present disclosure.
Figure 9B:
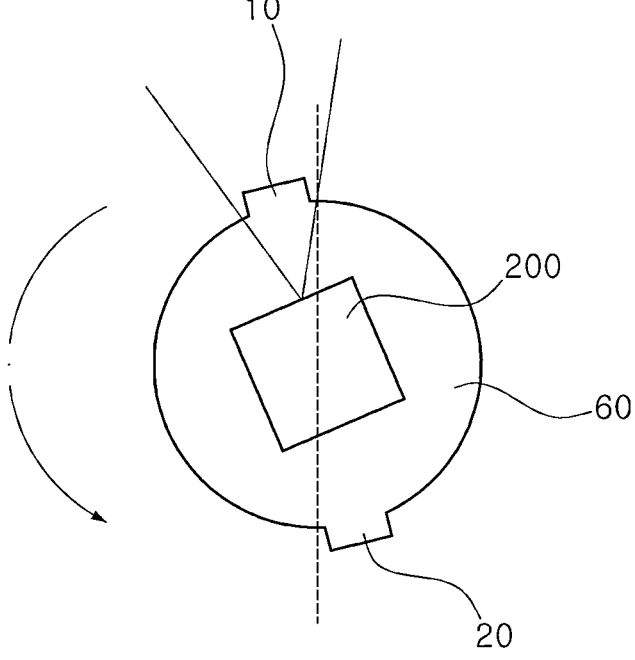

FIGS. 9A and 9B are views for describing a structure of a lamp applicable to the apparatus for recognizing the object of the vehicle according to one embodiment of the present disclosure.

In the example shown in FIGS. 9A and 9B, the first lamp 100 may include a cylindrical rotational body 60 configured to rotate around a predetermined rotational axis (not shown). The first optical device 10 and the second optical device 20 are disposed to be spaced apart from each other with a predetermined phase difference on a cylindrical outer circumferential surface of the rotational body 60.

One end of a rotational drive shaft 52 may be connected to one end of the rotational body 60 in an axial direction. The other end of the rotational drive shaft 52 may be connected to a drive source 53 such as a motor, for example. Accordingly, the rotational body 60 may receive a rotational driving force from the drive source 53 to rotate at a predetermined rotational speed.

When the rotational axis (not shown) of the rotational body 60 is arranged to extend in a width direction of the vehicle, as shown in FIG. 9B, the first optical device 10 and the second optical device 20 may face the front of the vehicle with a time difference while rotating integrally with the rotational body 60 when the rotational body 60 rotates. Accordingly, according to an embodiment, the light of the first pattern 1 and the light of the second pattern 2 may be alternately irradiated forward with a predetermined cycle through a simple structure even without alternately operating the first optical device 10 and the second optical device 20 at a fast cycle.

In addition, the camera 200 may be controlled so that the camera 200 is operated only when the rotational body 60 is in a predetermined phase (i.e., when the first optical device 10 faces forward as shown in FIG. 9B), or only the pattern reflected on the object 5 by the light of the first pattern 1 may be selectively processed when only an image of a frame corresponding to when the rotational body 60 is in the predetermined phase among images of a plurality of frames acquired by the camera 200 is used for object analysis.

Figure 10A:
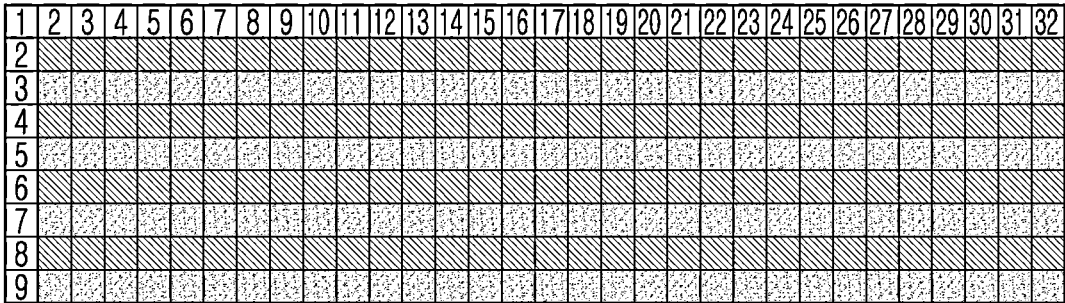
FIGS. 10A-10C are views showing types of light patterns formed by the apparatus for recognizing the object of the vehicle according to one embodiment of the present disclosure.
Figure 10B:
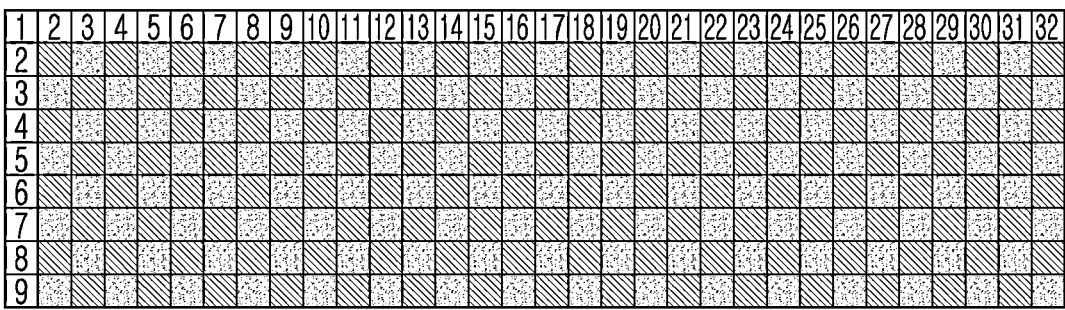
Figure 10C:
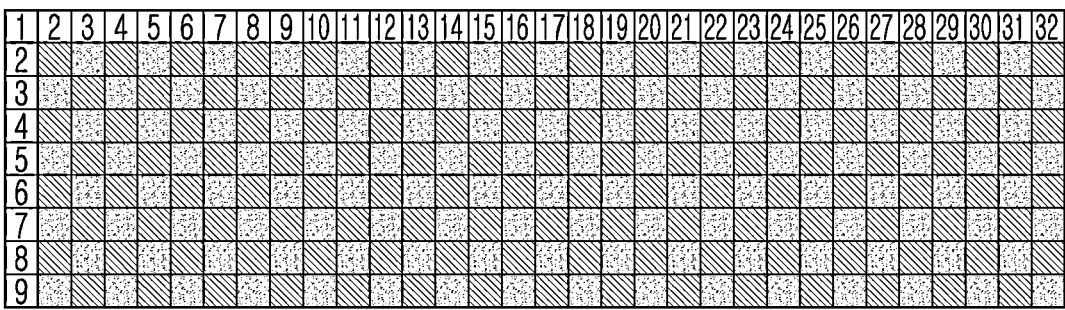

FIGS. 10A-10C are views showing types of light patterns formed by the apparatus for recognizing the object of the vehicle according to one embodiment of the present disclosure. Here, a portion where dots are distributed and marked brightly corresponds to a region where the optical device is, for example, turned on. A portion where oblique lines are formed and marked dark corresponds to a region where the optical device is partially turned off or blocked.

FIG. 10A shows a linear pattern extending in a vertical direction. FIG. 10B shows a linear pattern extending in a left-right direction. In addition, in addition to the linear pattern, light having a non-linear pattern as shown in FIG. 10C may also be formed. In addition, although not shown in the drawings, a pattern in which the linear pattern and the non-linear pattern are combined may also be formed.

FIGS. 11A-11D are views for describing operations for preventing pattern erroneous recognition in the apparatus for recognizing the object of the vehicle according to one embodiment of the present disclosure.

When the pattern is irradiated to the object 5 and captured by the camera 200, there may be a region where a distance between the patterns is dense and a region where a distance between the patterns is sparse on the image acquired by the camera 200. Here, when the distance between the patterns is too dense, a moiré phenomenon may occur and thus the camera may not distinguish the shape of the pattern. In particular, there may be no problem when there is no other object such as surrounding vehicles in front of the vehicle, but the failure to recognize the object due to the moiré phenomenon occurring when the object is first recognized at a long distance or when the object is present in a short-range dangerous region may lead to dangerous accidents.

Accordingly, as shown in FIG. 11A, when light having a constant distance is generated and irradiated and then the object is newly recognized through pattern analysis captured by the camera 200, as shown in FIGS. 11B and 11C, it is possible to prevent the moiré phenomenon from occurring in the corresponding region by sparsely adjusting the distance between the patterns only in the region where the object is recognized or the short-range dangerous region.

Figure 11D:
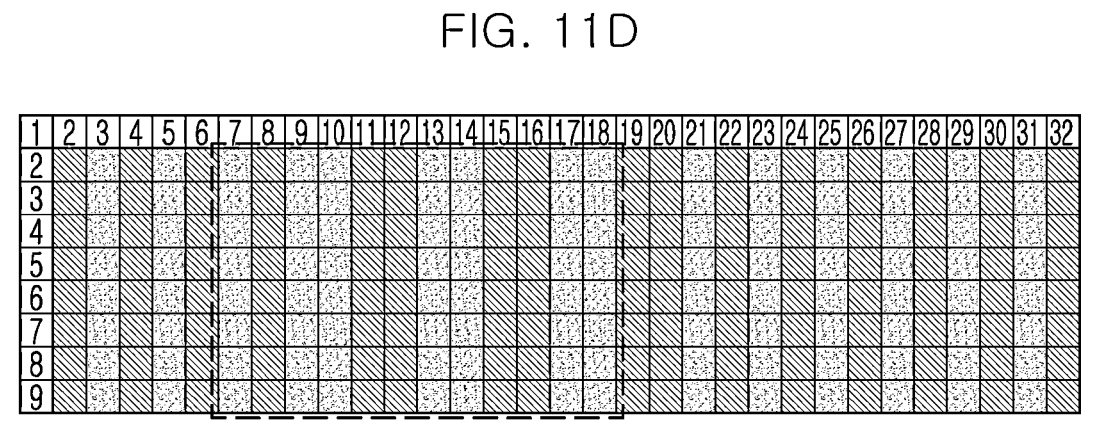

The moiré phenomenon may tend to occur in the short-range region or around a central region of the image. Accordingly, as shown in FIG. 11D, from the time of first forming the pattern, the distance between the patterns may be sparse in a specific region where the moiré easily occurs. A pattern having a dense shape may also be configured in the other regions.

FIGS. 12A-12D are views for describing operations for preventing pattern erroneous recognition in the apparatus for recognizing the object of the vehicle according to one embodiment of the present disclosure.

Figures 12A, 12B:
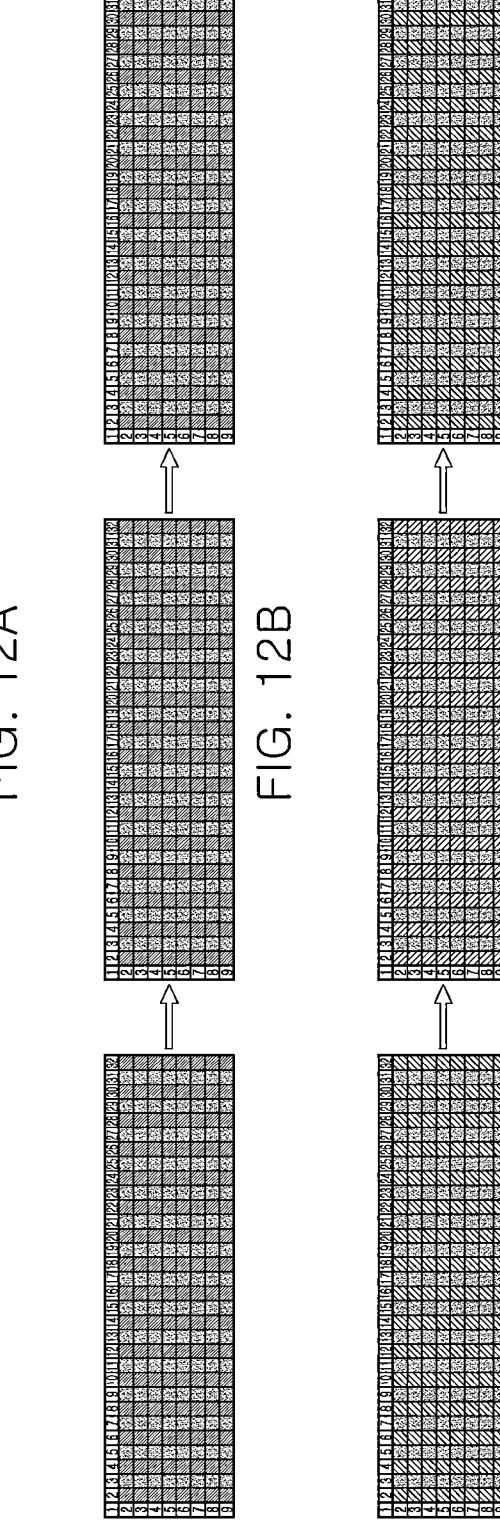
FIGS. 12A-12D are views for describing operations for preventing pattern erroneous recognition in the apparatus for recognizing the object of the vehicle according to one embodiment of the present disclosure.
Figures 12C, 12D:
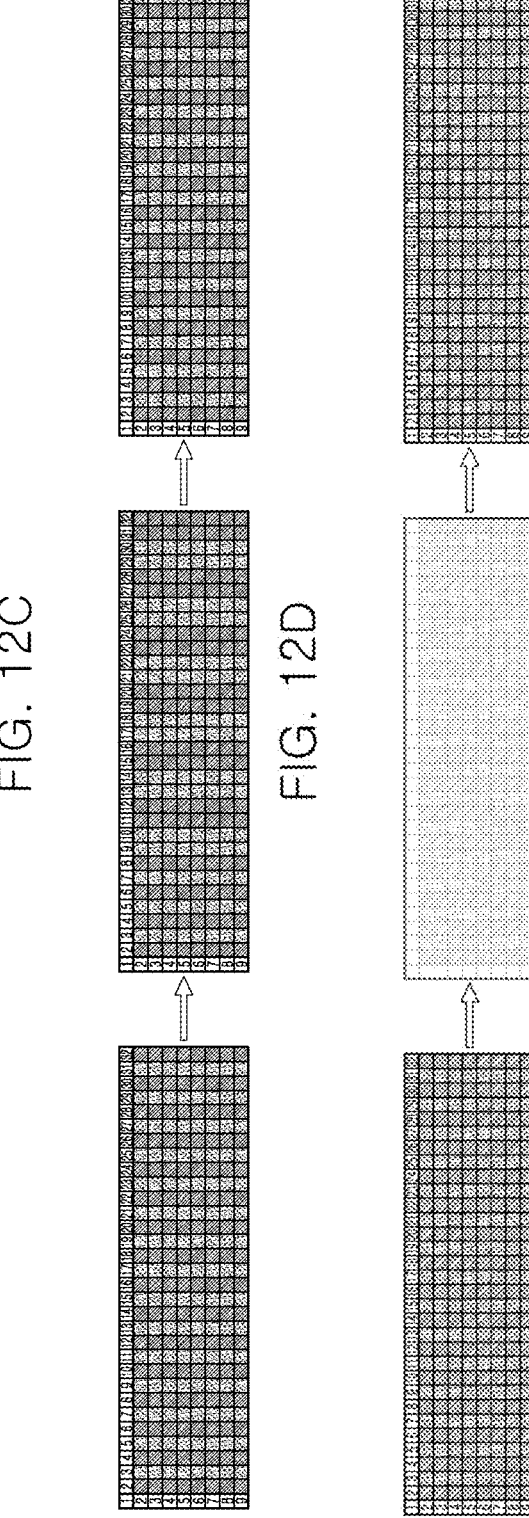

Upon driving at night when the amount of external light is not large, as shown in FIG. 12A, there may be no particular problem in the pattern recognition even when the shape of the pattern and a wavelength are kept constant.

However, when the amount of external light is large, such as during the daytime, it may be difficult to accurately recognize the pattern reflected on the object on the image due to the effect of the external light.

As shown in FIG. 11B, when a wavelength of the light of the first pattern 1 is changed whenever the first optical device 10 is turned on, the pattern may be detected using a change in the wavelength.

Alternatively, as shown in FIG. 11C, the pattern shape of the first pattern 1 may be changed whenever the first optical device 10 is turned on, or as shown in FIG. 11D, the pattern may also be detected by extracting only a region where the amount of light or the shape is periodically changed while changing the amount of light of the pattern.

However, when the amount of external light is greater than or equal to a certain value, as shown in FIGS. 11B-11D, there may occur a case in which the pattern may not be sufficiently detected only by the wavelength of the light, the shape of the pattern, and the change in the amount of light. Accordingly, it is possible to compensate for pattern recognition by allowing the image acquired by the camera 200 to be operated in the deep learning mode in which the object recognition is performed by deep learning as in the related art.

Figure 13A:
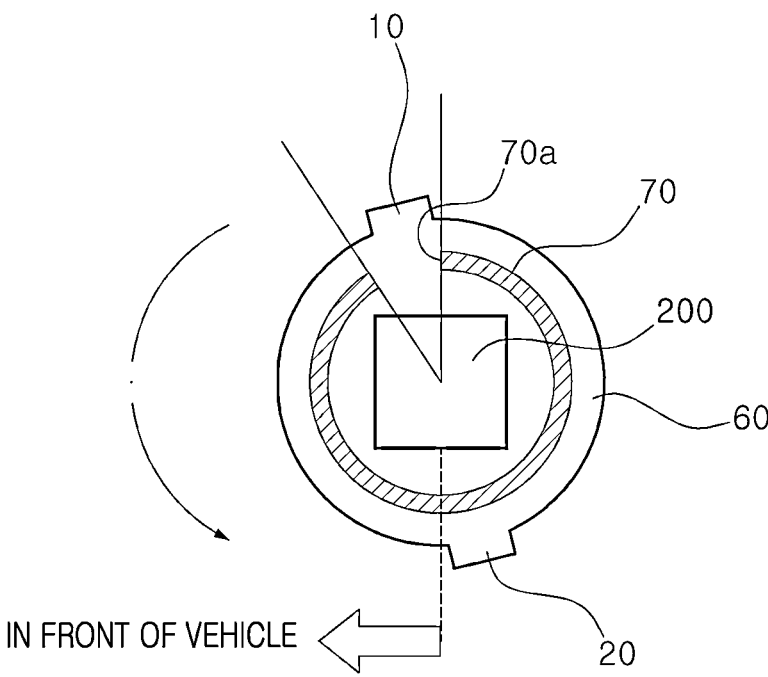
FIGS. 13A-13C are views for describing a structure for selectively recognizing only patterns of the first optical device in the apparatus for recognizing the object of the vehicle according to one embodiment of the present disclosure.
Figure 13B:
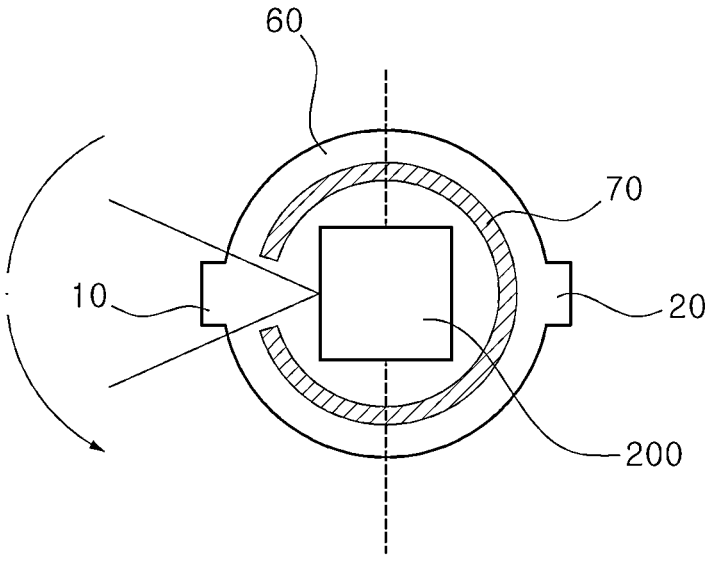
Figure 13C:
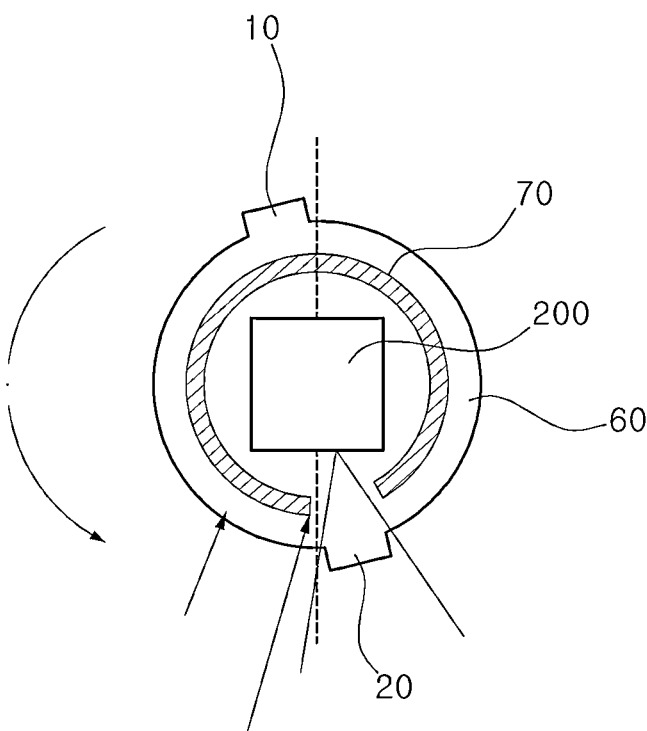

FIGS. 13A-13C are views for describing an structure for selectively recognizing only the first pattern 1 of the first optical device 10 in the apparatus for recognizing the object of the vehicle according to one embodiment of the present disclosure.

Comparing the structure of the first lamp 100 shown in FIG. 13A with the first lamp 100 shown in FIG. 9B, the first lamp 100 shown in FIG. 13A may be different from the first lamp 100 shown in FIG. 9B in that it further includes a camera-blocking shield 70 on the other end of the rotational body 60 in the axial direction.

The camera-blocking shield 70 may be configured to be rotated integrally with the rotational body 60. In addition, the camera-blocking shield 70 may have a hollow shape with an opening 70a on the outer circumference thereof. The camera 200 may be disposed therein. Here, as shown in FIG. 13A, the opening 70a of the camera-blocking shield 70 may be configured to face the first optical device 10. Accordingly, when the rotational body 60 rotates, an imaging unit (lens) of the camera 200, the opening 70a, and the first optical device 10 may be positioned on the same line when viewed from the side when the first optical device 10 is positioned in front of the vehicle. Accordingly, the camera 200 may image the shape of the pattern when the light of the first pattern 1 irradiated from the first optical device 10 is irradiated to the object. When the rotational body 60 is further rotated in this state, the imaging unit of the camera 200 may be covered by the camera-blocking shield 70 while the camera-blocking shield 70 rotates with the first optical device 10.

Accordingly, in an embodiment, except for the image of the frame corresponding to the state of being blocked by the camera-blocking shield 70 among the images of the plurality of frames acquired by the camera 200, it is possible to acquire only the image including the pattern formed according to the light of the first pattern 1. Accordingly, according to the above structure, it is possible to exclude the light of the second pattern 2 by the simple method and selectively acquire the image including only the pattern formed by the light of the first pattern 1.

Figure 14:
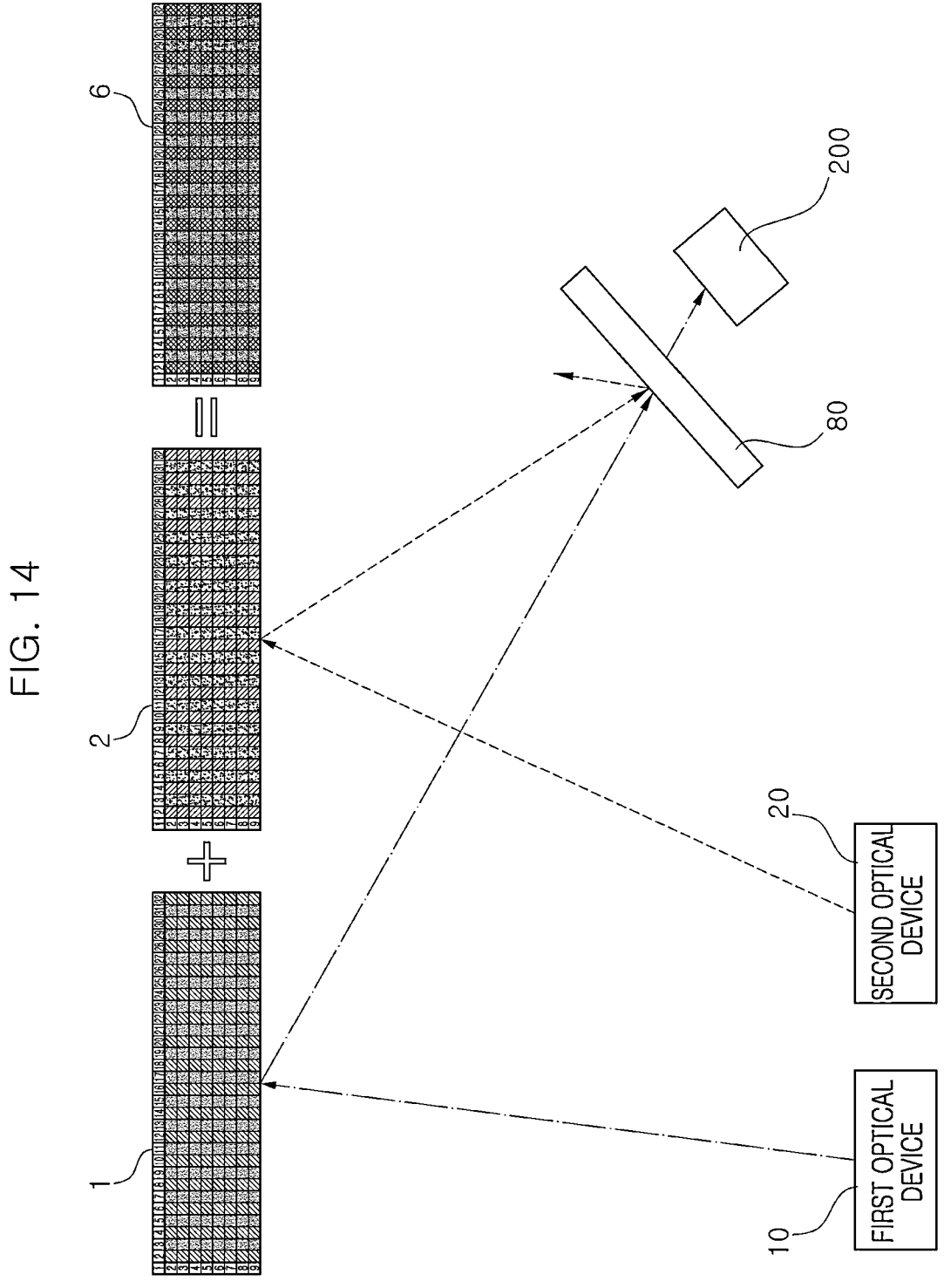
FIG. 14 is a view for describing the structure for selectively recognizing only the pattern of the first optical device in the apparatus for recognizing the object of the vehicle according to one embodiment of the present disclosure.

FIG. 14 is a view for describing the structure for selectively recognizing only the first pattern 1 of the first optical device 10 in the apparatus for recognizing the object of the vehicle according to one embodiment of the present disclosure.

In FIG. 14, a mechanical filter 80 configured to selectively transmit only the light of the first pattern 1 from the first optical device 10 and exclude the light of the second pattern 2 from the second optical device 20 may be provided in front of the camera 200.

For example, the light of the first pattern 1 and the light of the second pattern 2 may be configured to be light having different wavelength bands or light having different colors. When only light having a wavelength in a wavelength band or light having a color, to which the light of the first pattern 1 belongs is transmitted by the mechanical filter, the camera 200 may selectively recognize only the pattern by the light of the first pattern 1.

Figure 15:
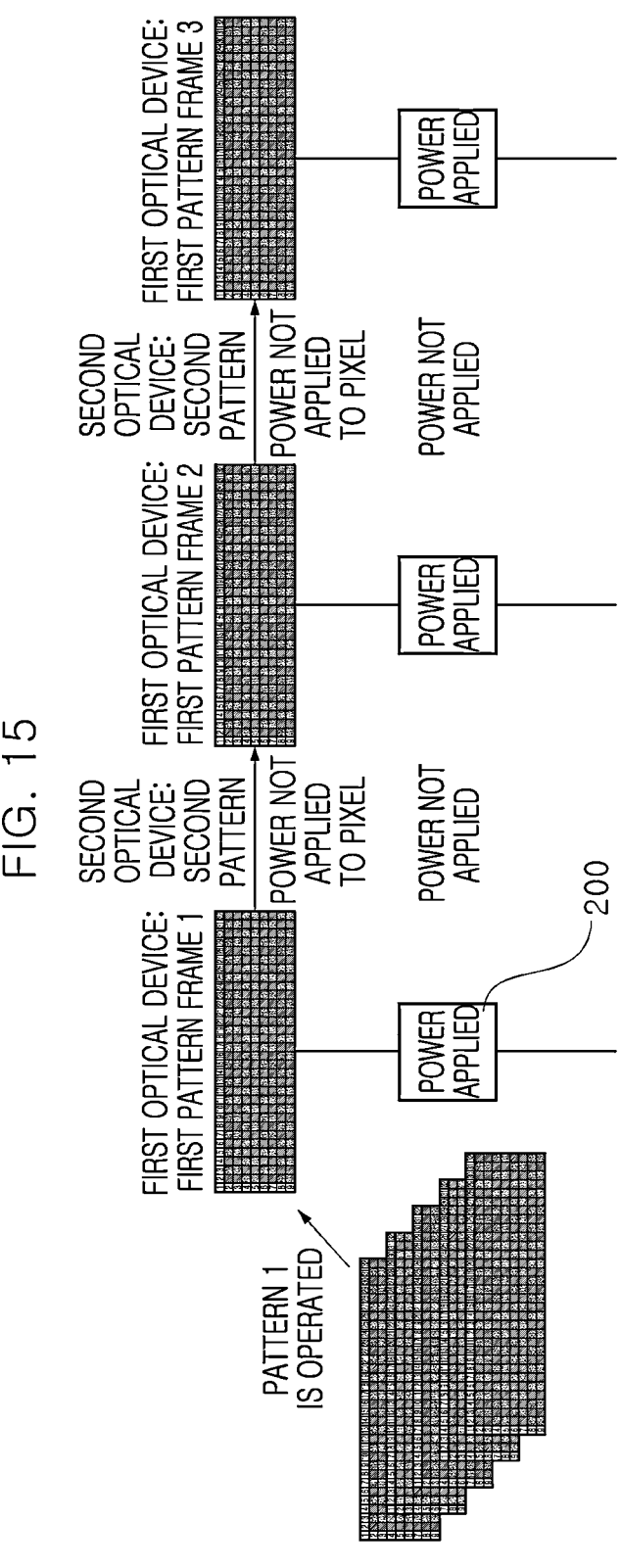
FIG. 15 is a view for describing the operation for selectively recognizing only the pattern of the first optical device in the apparatus for recognizing the object of the vehicle according to one embodiment of the present disclosure.

FIG. 15 is a view for describing the operation for selectively recognizing only the first pattern 1 of the first optical device 10 in the apparatus for recognizing the object of the vehicle according to one embodiment of the present disclosure.

In FIG. 15, the camera 200 may be operated by receiving power only when the camera 200 matches the frame in which the first optical device 10 operates, and selectively recognize only the light of the first pattern 1 by not receiving power in the frame in which the second optical device 20 operates.

In addition, according to the embodiment shown in FIG. 15, it is possible to secure a time required to allow the stimulation of the image sensor to decrease to a low level by cutting off the power supply to the camera 200 when the camera 200 matches the frame in which the second optical device 20 operates.

Figure 16:
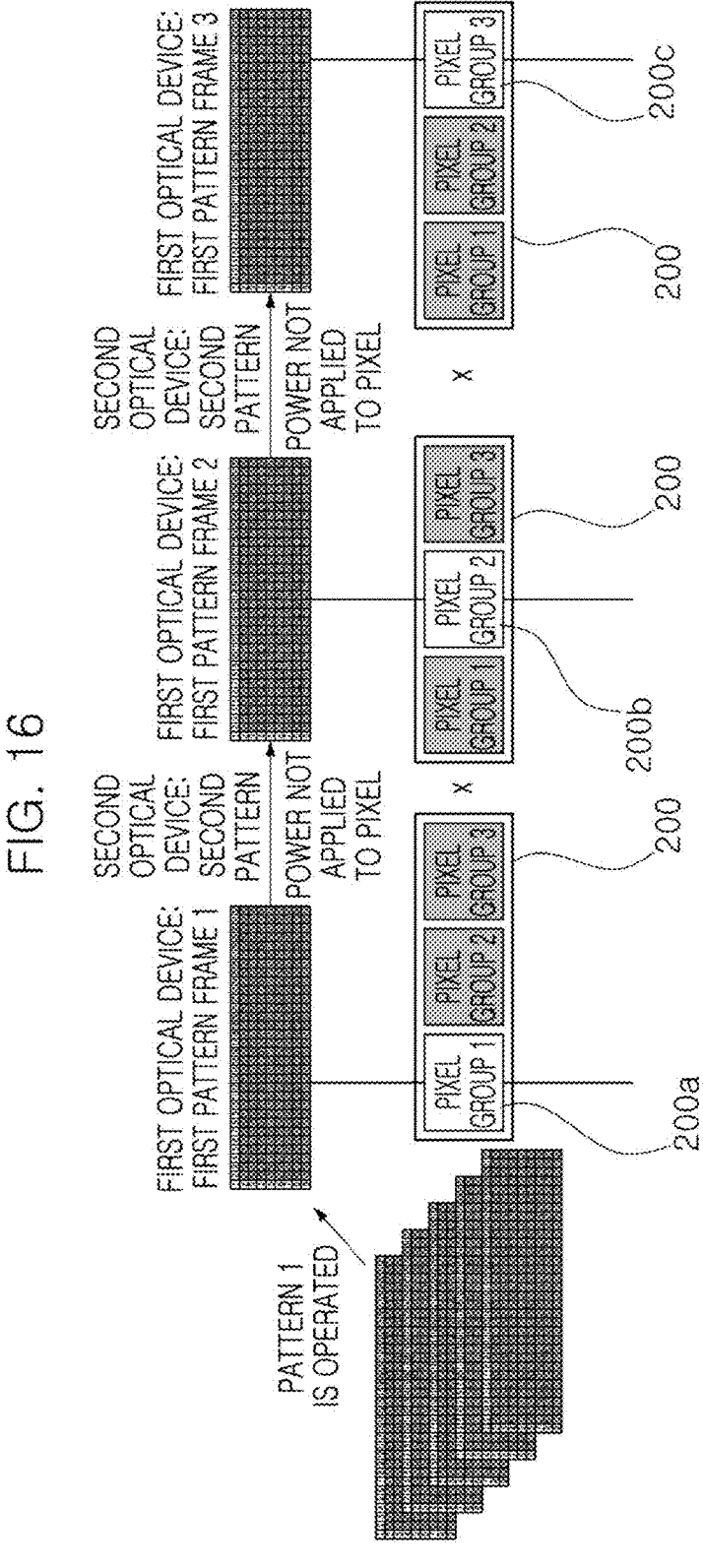
FIG. 16 is a view for describing the operation for selectively recognizing only the pattern of the first optical device in the apparatus for recognizing the object of the vehicle according to one embodiment of the present disclosure.

FIG. 16 is a view for describing the operation for selectively recognizing only the pattern of the first optical device in the apparatus for recognizing the object of the vehicle according to one embodiment of the present disclosure.

In the example of FIG. 16, the camera 200 (image sensor) may be composed of a plurality of pixel groups 200a, 200b, and 200c and configured to alternately operate in a unit of a pixel group.

According to the above configuration, only pixel groups of the image sensor which match the frame in which the first optical device 10 operates are operated. The pixel groups of the image sensor are not operated in the other frames. For example, in the example of FIG. 16, in frame 1 in which the first optical device 10 operates, only a pixel group 1 200*a* corresponding thereto operates. When the camera 200 matches a frame in which the second optical device 20 operates, the power supply to the entire camera 200 may be cut off. When the first optical device 10 operates again and power is applied to the camera 200, only a pixel group 2 200*b* corresponding to frame 2 matched therewith may be operated. In addition, when the second optical device 20 operates again, the power supply to the camera 200 may be cut off. When the first optical device 10 operates again and power is applied to the camera 200, only a pixel group 3 200*c* corresponding to frame 3 matched therewith may be operated.

According to the example of FIG. 16, when the first optical device 10 is operated, only the specific pixel group matched therewith may be operated. The other pixel groups are maintained in a state of being not operated, thereby additionally securing the time required to allow the stimulation of the image sensor to decrease to the low level FIG. 17 is a view for describing the operation for selectively recognizing only the pattern of the first optical device in the apparatus for recognizing the object of the vehicle according to one embodiment of the present disclosure.

The examples shown in FIGS. 13A-16 show that only the light of the first pattern may be selectively extracted by the physical means. On the other hand, in the example shown in FIG. 17, only the frames in which the first pattern operates by software among the plurality of frames acquired by the camera 200 may be selectively extracted and used by the control unit 300.

Figure 17:
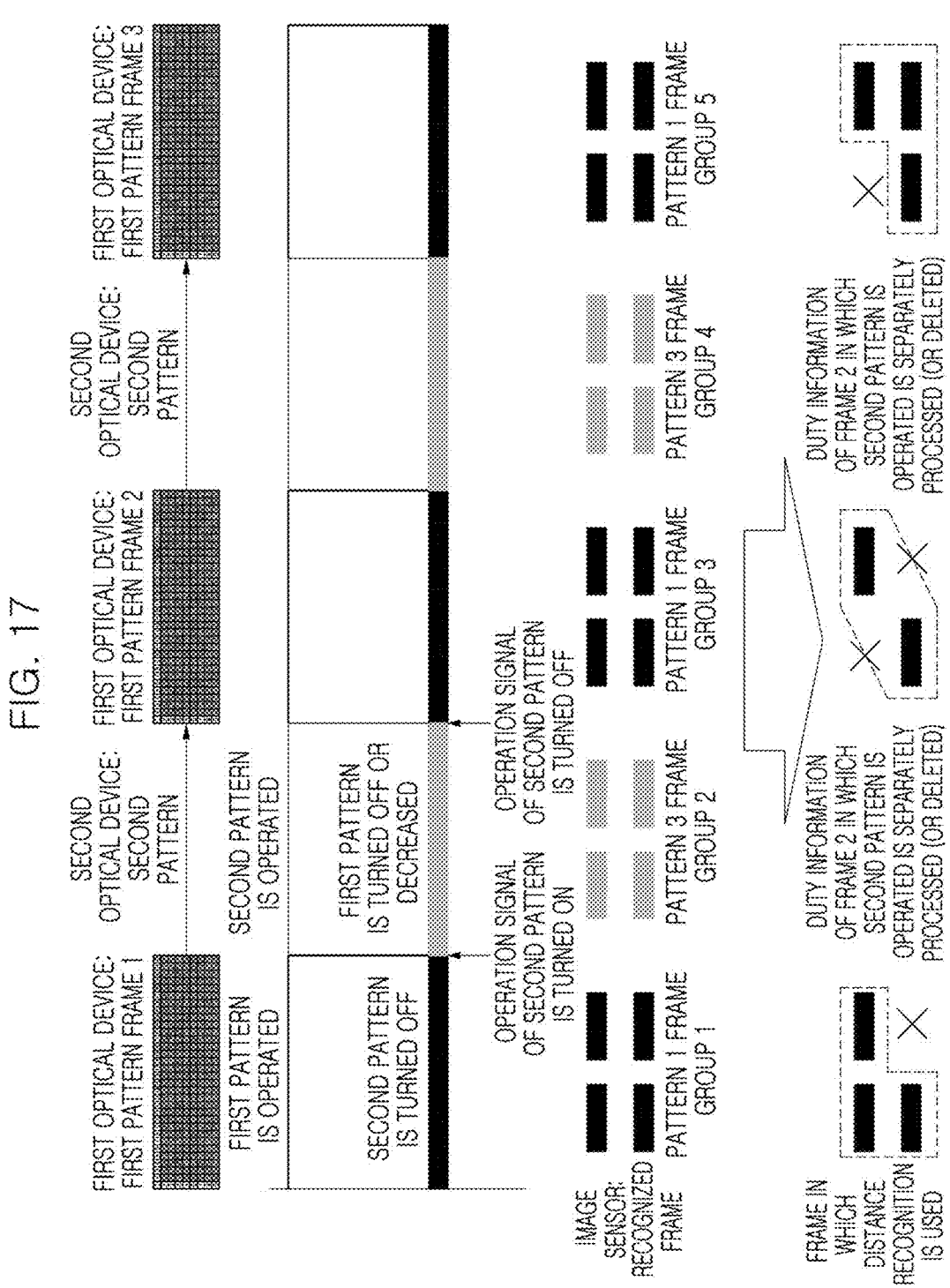
FIG. 17 is a view for describing the operation for selectively recognizing only the pattern of the first optical device in the apparatus for recognizing the object of the vehicle according to one embodiment of the present disclosure.

As shown in FIG. 17, a frame corresponding to a timing point when a control duty is applied to the second optical device 20 and the second optical device 20 operates among the plurality of frames may be deleted by software. In addition, by deleting a frame adjacent to an operation timing point of the second optical device 20 even when the control duty is applied to the first optical device 10 and the first optical device 10 is operated, only the frame corresponding to the duty in which the first pattern 1 accurately operates may be selectively extracted and used.

Figures 18A, 18B:
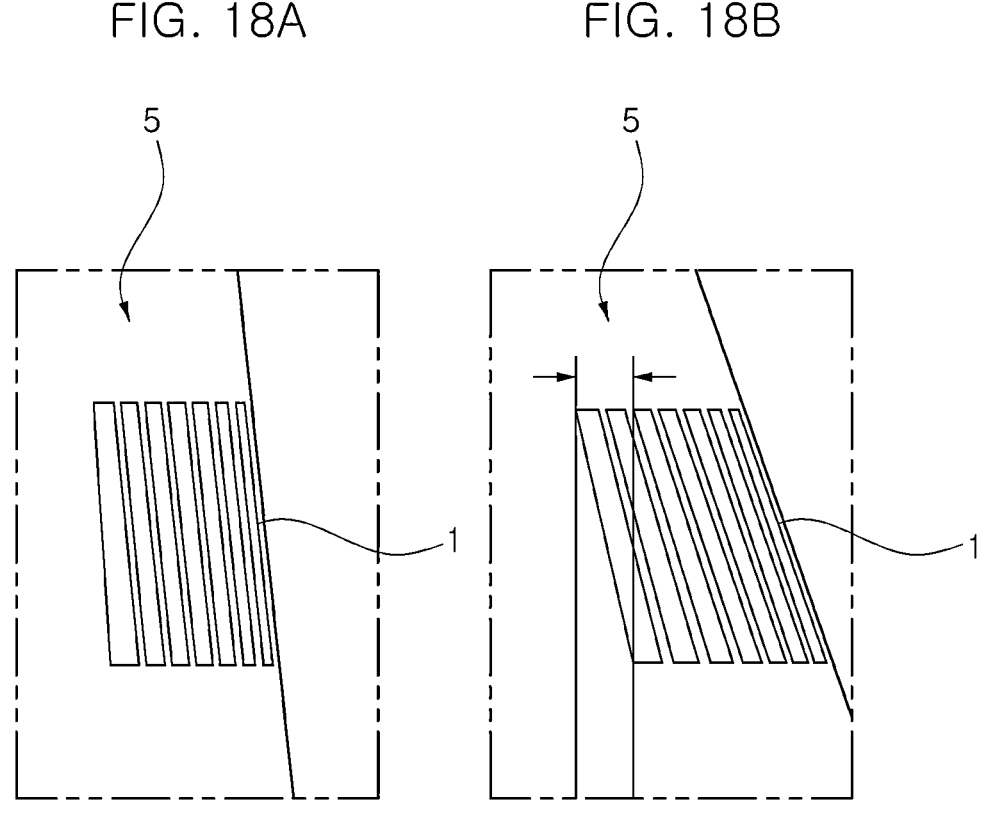
FIGS. 18A and 18B are views for describing a difference in pattern recognition according to a position of a camera.

FIGS. 18A and 18B are views for describing a difference in pattern recognition according to a position of a camera.

In FIG. 2A, the first lamp 100 and the second lamp 400 disposed to be spaced apart from the first lamp 100 may be provided. The camera 200 may be disposed of at the central position of the first lamp 100 and the second lamp 400.

In order to most effectively recognize the pattern, it is possible to maximize the sense of pattern change by arranging the lamp configured to form the pattern and the camera configured to recognize the corresponding pattern to be spaced apart from each other as far as possible. Accordingly, when two lamps 100 and 400 and one camera 200 are used as in the example of FIG. 2A, it is effective to position the camera 200 between the lamps 100 and 400.

When two lamps and two or more cameras are used, a plurality of cameras may be used between the two lamps as in the example of FIG. 2A. However, as described above, because the lamp and the camera may be spaced apart from each other as far as possible, it is most effective to position the two cameras inside the opposite lamps when two cameras are used. In other words, when one first camera configured to recognize the first pattern 1 formed by the first lamp 100 and a second camera configured to recognize the third pattern 3 formed by the second lamp 400 are provided, the first camera may be positioned inside the second lamp 400. The second camera may be positioned inside the first lamp 100.

In FIG. 18A, when two lamps and two cameras are provided, the shape of the first pattern 1 displayed on the object 5 may be shown when the two cameras are arranged at the centers of the two lamps. In FIG. 18B, as shown in FIG. 18A, when two lamps and two cameras are provided, the shape of the first pattern 1 displayed on the object 5 may be shown when the two cameras are positioned inside the opposite lamps, respectively.

As described above, the apparatus for recognizing the object according to the present disclosure may calculate the shape of the object or the like, through the change in the slope of the pattern. It can be seen that the size of the slope of the pattern in the case of FIG. 18B is greater than that of the case of FIG. 18A. In other words, it can be seen that the phase difference of the acquired information increases in the case of FIG. 18B in which the distance between the lamp and the camera is greater. Accordingly, it is possible to more accurately calculate the object recognition by more accurately detecting the change in the pattern shape by arranging the respective cameras inside the opposite lamps when two cameras are applied.

Figure 19:
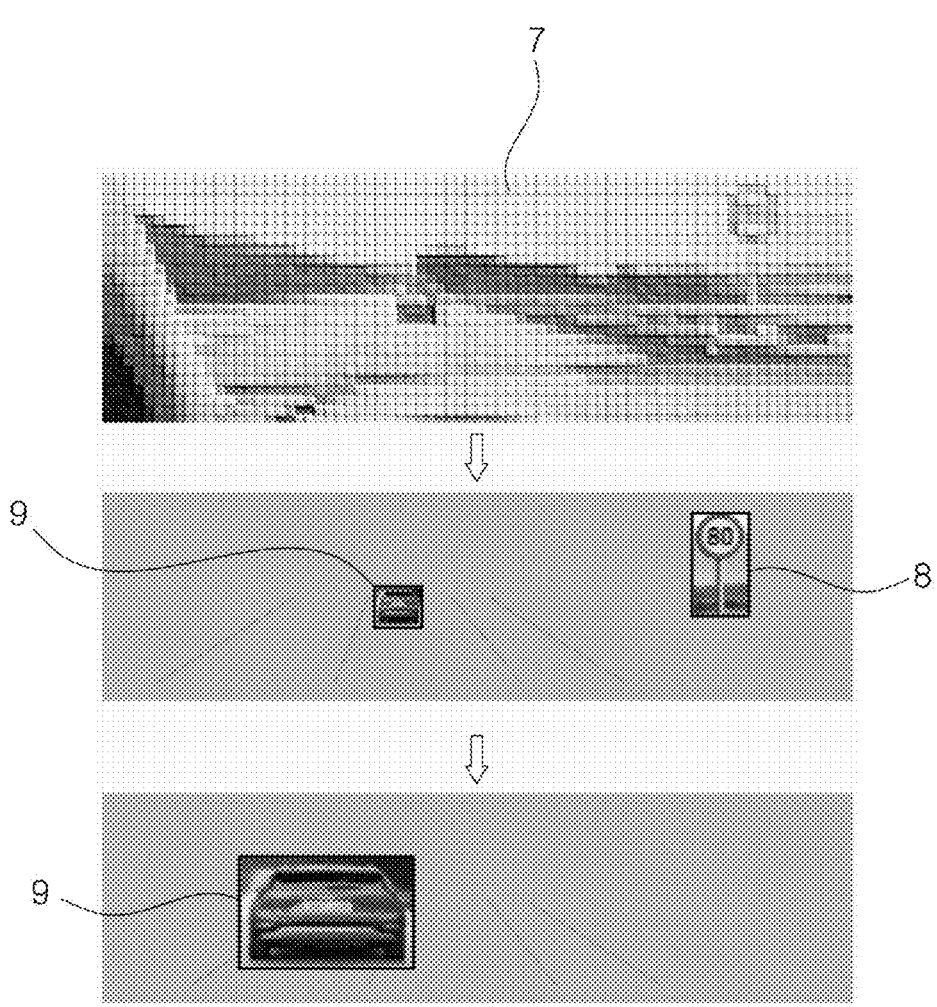
FIG. 19 is a view for describing an operation of the apparatus for recognizing the object of the vehicle according to one embodiment of the present disclosure.

FIG. 19 is a view for describing an operation of the apparatus for recognizing the object of the vehicle according to one embodiment of the present disclosure.

When the information detected by the camera 200 is used as a calculation target, it takes a lot of time to process the calculation due to too much information. In addition, an expensive processing device may be required to process the information at a high speed.

Accordingly, in the present disclosure, as shown in FIG. 19, it is possible to simplify the calculation by partitioning an image 7 captured by the camera 200 and analyzing changes in patterns in the corresponding regions using only some regions 8 and 9 among the partitioned regions as the processing target.

In extracting a predetermined region corresponding to the calculation target from the partitioned images, a shape of the object recognized through pattern detection, a change in a color of the pattern, a shape or color of the object on the image, and the like, may be extracted through the comparison with a predetermined standard.

In the example shown in FIG. 19, when the presence of the sign 8 on the road or the surrounding vehicle 9 is confirmed through the image analysis or the pattern analysis, it is possible to simplify the calculation by performing the pattern analysis using only the regions around the corresponding elements as the analysis target.

Figure 20:
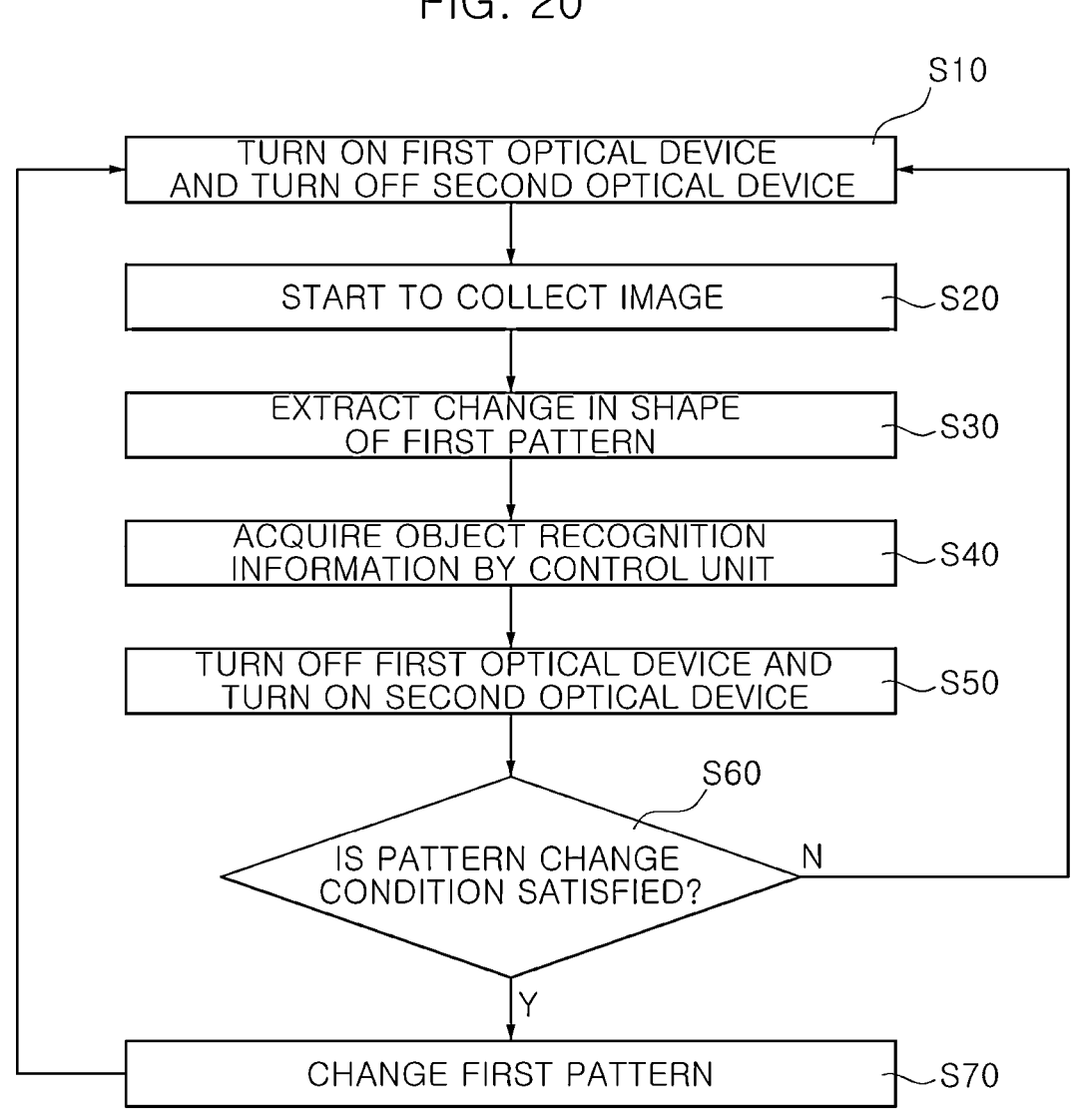
FIG. 20 is a flowchart showing a method of recognizing an object of a vehicle according to one embodiment of the present disclosure.

FIG. 20 is a flowchart showing a method of recognizing an object of a vehicle according to one embodiment of the present disclosure.

Hereinafter, it is assumed that the apparatus of FIG. 1 performs a process of FIG. 20. In other words, it can be understood that the process shown in FIG. 20 is performed by the control unit 300 of FIG. 1.

Referring to FIG. 20, first, in operation S10, the control unit 300 turns on the first optical device 10 and turns off the second optical device 20. This may be an operation in which power is physically applied to the first optical device 10 and the power supply to the second optical device 20 is cut off, or may also be an operation in which the light of the first pattern 1 from the first optical device 10 is irradiated to the object. The light of the second pattern 2 from the second optical device 20 is blocked.

When the light of the first pattern 1 is irradiated to the object, the camera 200 starts to collect images (S20). Specifically, the camera 200 captures the object, such as a surrounding vehicle, which is present in front of a vehicle traveling direction, and the image including the first pattern 1 irradiated to the object.

Next, the control unit 300 extracts the change in the shape of the first pattern 1 from the image acquired by the camera 200 (S30). In order to decrease the burden of calculation, the control unit 300 divides the image into a plurality of partitions and then extracts only the partition where the main object is positioned to detect the spatial and temporal changes of the first pattern 1 within the corresponding partition.

Next, the control unit 300 acquires object recognition information from the temporal change of the first pattern 1 (S40). Even in the case of the same pattern, the shape of the pattern reflected on the object is changed depending on the shape or motion state of the object. Accordingly, it is possible to acquire information on the shape and motion state of the object from the spatial and temporal changes such as the width of the pattern, the size of the pattern, the number of patterns, and the contrast of the pattern of the first pattern 1 reflected on the object.

After the object recognition information is completely acquired, the control unit 300 turns off the first optical device 10 and turns on the second optical device 20 (S50). The light of the second pattern 2 generated and irradiated by the second optical device 20 functions to compensate for the insufficient amount of the light of the first pattern 1 by irradiating the region where the light of the first pattern 1 is not irradiated and prevent a driver or pedestrians from recognizing the patterns and their changes.

The control unit 300 determines whether a predetermined pattern change condition is satisfied (S60). When it is determined that the pattern change is required, the shape of the first pattern 1 is changed (S70). In other words, when it is determined that the amount of external light is greater than or equal to a certain level through an illuminance sensor installed in the vehicle or when it is determined that the risk of the occurrence of moiré is high, an interval between the patterns, the wavelength of the pattern, the contrast of the pattern, or the like, may be adjusted to increase a pattern recognition rate. As necessary, the second pattern 2 may also be changed depending on the change in the first pattern 1.

The above description is merely illustrative of the technical spirit of the present disclosure. Various modifications and variations are possible by those having ordinary skill in the art to which the present disclosure pertains without departing from the essential characteristics of the present disclosure.

Accordingly, the embodiments disclosed in the present disclosure are not intended to limit the technical spirit of the present disclosure but to describe it. The scope of the technical spirit of the present disclosure is not limited by these embodiments. The scope of the present disclosure should be construed by the appended claims. All technical spirits within the scope equivalent thereto should be construed as being included in the scope of the present disclosure.

What is claimed is:

1. An apparatus for recognizing an object in front of a vehicle using pattern recognition, the apparatus comprising:
 a first lamp including
  a first optical device configured to generate light of a first pattern and irradiate the light of the first pattern to the object according to a predetermined cycle, wherein i) the light of the first pattern includes a light irradiation region where the object is reflected by the light irradiated from the first optical device and a light blocking region where the light from the first optical device does not reach the object and ii) the light irradiation region and the light blocking region of the first pattern alternate with each other, and
 a second optical device configured to generate light of a second pattern and irradiate the light of the second pattern to the object, wherein i) the light of the second pattern includes a light irradiation region where the object is reflected by the light irradiated from the second optical device and a light blocking region where the light from the second optical device does not reach the object and ii) the light irradiation region and the light blocking region of the second pattern alternate with each other;
 a camera configured to recognize the first pattern irradiated to the object when the light of the first pattern is irradiated to the object; and
 a control unit configured to acquire object recognition information of the object based on the first pattern recognized by the camera,
 wherein the light irradiation region of the second pattern is formed to fill a region between the light irradiation region and the light blocking region of the first pattern to supplement insufficient amount of light provided by the light having the first pattern irradiated by the first optical device.

2. The apparatus of claim 1,
 wherein a cycle at which the first optical device and the second optical device irradiate light is 60 Hertz (Hz) or higher.

3. The apparatus of claim 1,
 wherein the first optical device and the second optical device are controlled by a single lamp control unit.

4. The apparatus of claim 1,
 wherein the control unit is configured to acquire distance information between the object and the vehicle using at least one of a width of the first pattern irradiated to the object, a size of the first pattern, a number of first patterns, or a contrast of the first pattern.

5. The apparatus of claim 1,
 wherein the control unit is configured to acquire shape information of the object using a change in a slope of the first pattern irradiated to the object.

6. The apparatus of claim 1,
 wherein the first pattern and the second pattern are formed by partially shielding the light from the first optical device and the second optical device using a physical blocking element.

7. The apparatus of claim 1,
 wherein the first pattern and the second pattern are formed using an inner lens having a predetermined pattern shape disposed of in front of light irradiation directions of the first optical device and the second optical device.

8. The apparatus of claim 1,
 wherein the first lamp includes a rotational body configured to rotate around a predetermined rotational axis, and
 the first optical device and the second optical device are provided on an outer circumferential surface of the rotational body with a predetermined phase difference.

9. The apparatus of claim 8, wherein the camera is configured to recognize the first pattern irradiated to the object when the rotational body rotates to a predetermined phase so that the first optical device is positioned in a direction of irradiating light toward the object.

10. The apparatus of claim 8, further comprising a camera-blocking shield configured to block image recognition of the camera when the first optical device is not positioned in a direction of irradiating light toward the object on the rotational body.

11. The apparatus of claim 1, further comprising:
a mechanical filter configured to transmit the light of the first pattern and block the light of the second pattern; or
a software filter configured to selectively calculate only the light of the first pattern in front of the camera.

12. The apparatus of claim 1, wherein a pattern shape of the light of the first pattern generated from the first optical device is configured to be changed whenever the first optical device is turned on.

13. The apparatus of claim 12, wherein at least one of a pattern shape, a wavelength, or an intensity of the light of the first pattern generated from the first optical device is configured to be changed based on an intensity of light outside the vehicle.

14. The apparatus of claim 1,
wherein the control unit is configured to acquire object recognition information of the object by selectively extracting only a frame corresponding to a control duty which operates the first optical device among frames recognized by the camera.

15. The apparatus of claim 1,
wherein the control unit is configured to partition information recognized by the camera and acquire object recognition information of the object only based on a change in a first pattern in a specific partition.

16. The apparatus of claim 1, further comprising a second lamp including:
a third optical device configured to generate light of a third pattern and irradiate the light of the third pattern to the object according to a predetermined cycle; and a fourth optical device configured to generate light of a fourth pattern and irradiate the light of the fourth pattern to the object when the light of the third pattern is not irradiated,
wherein the camera is configured to recognize the first pattern and the third pattern irradiated to the object, and the control unit is configured to acquire object recognition information of the object based on the first pattern and the third pattern recognized by the camera.

17. The apparatus of claim 16,
wherein the camera includes:
a first camera configured to recognize the light of the first pattern irradiated to the object; and
a second camera configured to recognize the light of the third pattern irradiated to the object, and
wherein i) the first camera is provided inside the second lamp and ii) the second camera is provided inside the first lamp.

18. A method of recognizing an object for a vehicle using the apparatus of claim 1, the method comprising:
generating light of the first pattern and light of the second pattern and alternately irradiating the light to the object;
recognizing a shape of the first pattern irradiated to the object using the camera when the light of the first pattern is irradiated to the object; and
extracting a change in the first pattern recognized by the camera and acquiring object recognition information of the object based on the extracted change in the first pattern.

19. The method of claim 18, further comprising:
determining whether a predetermined pattern change condition is satisfied; and
adjusting at least one of a shape, a wavelength, or an intensity of the first pattern when the predetermined pattern change condition is satisfied.

* * * * *